United States Patent
Potter et al.

(10) Patent No.: US 10,991,272 B2
(45) Date of Patent: Apr. 27, 2021

(54) CLEAR EXTENDED CONTENT LABEL WITH SELECTIVELY DETACKIFIED ADHESIVE

(71) Applicant: Avery Dennison Corporation, Glendale, CA (US)

(72) Inventors: Craig W. Potter, Mentor, OH (US); Amy Van, Beachwood, OH (US); David W. Whitman, State College, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 16/936,005

(22) Filed: Jul. 22, 2020

(65) Prior Publication Data

US 2020/0349867 A1 Nov. 5, 2020

Related U.S. Application Data

(62) Division of application No. 15/438,044, filed on Feb. 21, 2017.

(Continued)

(51) Int. Cl.
*G06F 3/00* (2006.01)
*C09J 7/35* (2018.01)
(Continued)

(52) U.S. Cl.
CPC ........... *G09F 3/0289* (2013.01); *B31D 1/021* (2013.01); *B31D 1/027* (2013.01); *C09J 7/35* (2018.01);
(Continued)

(58) Field of Classification Search
CPC .. G09F 3/0289; G09F 2003/0252; C09J 7/38; C09J 7/35; C09J 7/40; C09J 7/385;
(Continued)

(56) References Cited

U.S. PATENT DOCUMENTS

| 4,208,313 | A | 6/1980 | Lewis et al. |
| 4,314,415 | A | 2/1982 | De Woskin |

(Continued)

FOREIGN PATENT DOCUMENTS

| BR | PI0701669 | 1/2009 |
| BR | PI0801261 | 1/2009 |

(Continued)

OTHER PUBLICATIONS

Written Opinion of the International Preliminary Examining Authority dated Mar. 22, 2018 issued in corresponding IA No. PCT/US2017/018676 filed Feb. 21, 2017.

(Continued)

*Primary Examiner* — Justin V Lewis

(57) ABSTRACT

Methods of preparing extended content labels from prefabricated adhesive assemblies are described. The methods do not require delamination or relamination of the prefabricated adhesive assemblies. The prefabricated adhesive assemblies include a transparent face layer and an adhesive layer sensitive to radiant energy. Extended content printing is applied to a front face of the face layer. A mask is positioned between the adhesive layer and a radiant energy source. Radiant energy not blocked by the mask reduces the adhesion of irradiated portions of the adhesive layer. A floodcoat is applied over the extended content indicia, and front side indicia is applied over the floodcoat and is visible through the face layer and adhesive layer from a back side of the face layer.

26 Claims, 6 Drawing Sheets

Related U.S. Application Data

(60) Provisional application No. 62/298,146, filed on Feb. 22, 2016.

(51) Int. Cl.

| | | |
|---|---|---|
| *C09J 7/40* | (2018.01) | |
| *C09J 7/38* | (2018.01) | |
| *B31D 1/02* | (2006.01) | |
| *B32B 37/20* | (2006.01) | |
| *B32B 38/10* | (2006.01) | |
| *G09F 3/02* | (2006.01) | |
| *G09F 3/00* | (2006.01) | |

(52) U.S. Cl.
CPC .............. C09J 7/38 (2018.01); C09J 7/385 (2018.01); C09J 7/40 (2018.01); *B32B 37/203* (2013.01); *B32B 38/10* (2013.01); *B32B 2519/00* (2013.01); *C09J 2203/334* (2013.01); *C09J 2301/416* (2020.08); *G09F 2003/0252* (2013.01)

(58) Field of Classification Search
CPC .......... C09J 2203/334; C09J 2301/416; B31D 1/021; B31D 1/027; B32B 2519/00; B32B 37/203; B32B 38/10
USPC ...... 283/67, 70, 72, 74, 79, 81, 94, 98, 101, 283/109
See application file for complete search history.

(56) References Cited

U.S. PATENT DOCUMENTS

| | | | |
|---|---|---|---|
| 4,347,300 A | 8/1982 | Shimazu et al. | |
| 4,513,039 A | 4/1985 | Esmay | |
| 4,830,910 A | 5/1989 | Larson | |
| 4,842,660 A | 6/1989 | Voltmer et al. | |
| 4,873,140 A | 10/1989 | McIntyre | |
| 5,196,504 A | 3/1993 | Scholz et al. | |
| 5,306,744 A | 4/1994 | Wolfersberger et al. | |
| 5,346,766 A | 9/1994 | Otter et al. | |
| 5,378,997 A | 1/1995 | Sawyer | |
| 5,387,768 A | 2/1995 | Izard et al. | |
| 5,389,178 A | 2/1995 | Harvey | |
| 5,409,971 A | 4/1995 | Wolfersberger et al. | |
| 5,476,565 A | 12/1995 | Akada et al. | |
| 5,525,422 A | 6/1996 | Spies et al. | |
| 5,618,600 A | 4/1997 | Denklau | |
| 5,687,154 A | 11/1997 | Tsuchiya et al. | |
| 5,702,127 A | 12/1997 | Korondi, Jr. | |
| 5,738,381 A | 4/1998 | Treleaven et al. | |
| 5,849,385 A | 12/1998 | Cummings et al. | |
| 6,017,408 A | 1/2000 | Rogers et al. | |
| 6,174,578 B1 | 1/2001 | Holley | |
| 6,306,475 B1 | 10/2001 | Stocq et al. | |
| 6,348,262 B1 | 2/2002 | Huffman | |
| 6,364,990 B1 | 4/2002 | Grosskopf et al. | |
| 6,461,728 B2 | 10/2002 | Weiss et al. | |
| 6,685,228 B2 | 2/2004 | Riley | |
| 6,783,850 B2 | 8/2004 | Takizawa et al. | |
| 7,157,520 B2 | 1/2007 | Higuchi et al. | |
| 7,459,193 B2 | 12/2008 | Utz | |
| 7,473,454 B2 | 1/2009 | Vertanen | |
| 7,510,764 B2 | 3/2009 | Husemann et al. | |
| 7,687,125 B2 | 3/2010 | Gavel et al. | |
| 7,858,709 B2 | 12/2010 | Takahasi et al. | |
| 8,252,425 B2 | 8/2012 | Lee et al. | |
| 8,252,709 B2 | 8/2012 | Kato et al. | |
| 8,377,535 B2 | 2/2013 | Nakagawa et al. | |
| 8,389,596 B2 | 3/2013 | Boyce et al. | |
| 8,439,403 B2 | 5/2013 | Kittler, Jr. et al. | |
| 8,763,890 B2 | 7/2014 | Clark et al. | |
| 8,875,356 B2 | 11/2014 | Zerfas et al. | |
| 9,092,998 B2 | 7/2015 | Masutani et al. | |
| 9,096,780 B2 | 8/2015 | Zerfas et al. | |
| 9,458,358 B2 | 10/2016 | De Boer et al. | |
| 9,683,136 B2 | 6/2017 | De Boer et al. | |
| 2001/0026907 A1 | 10/2001 | Husemann et al. | |
| 2002/0060223 A1 | 5/2002 | O'Brien | |
| 2002/0068141 A1 | 6/2002 | Pieper et al. | |
| 2003/0035014 A1 | 2/2003 | Adams et al. | |
| 2003/0108738 A1 | 6/2003 | Alahapperuma et al. | |
| 2003/0198773 A1 | 10/2003 | Miekka et al. | |
| 2004/0106693 A1 | 6/2004 | Kauffman et al. | |
| 2004/0206446 A1 | 10/2004 | Charley | |
| 2004/0209028 A1* | 10/2004 | Gosselin ................. B32B 27/32 428/40.1 |
| 2005/0025924 A1 | 2/2005 | Toyama | |
| 2006/0078703 A1 | 4/2006 | Virtanen | |
| 2008/0143094 A1 | 6/2008 | Goetz | |
| 2009/0116111 A1 | 5/2009 | Toyama | |
| 2012/0003470 A1 | 1/2012 | Kamiya et al. | |
| 2012/0177307 A1 | 7/2012 | Duan et al. | |
| 2012/0258271 A1 | 10/2012 | Maughan | |
| 2013/0048221 A1 | 2/2013 | Blackwell et al. | |
| 2013/0133532 A1 | 5/2013 | Kian et al. | |
| 2013/0178554 A1 | 7/2013 | Boyce et al. | |
| 2014/0069587 A1 | 3/2014 | Rackovan et al. | |
| 2014/0083603 A1 | 3/2014 | Delise, Jr. | |
| 2014/0090778 A1 | 4/2014 | Galoff et al. | |
| 2014/0178599 A1 | 6/2014 | Wright et al. | |
| 2014/0250641 A1 | 9/2014 | Zerfas et al. | |
| 2014/0259834 A1 | 9/2014 | Galoff et al. | |
| 2015/0068658 A1 | 3/2015 | Merrill et al. | |
| 2015/0191633 A1 | 7/2015 | De Boer et al. | |
| 2015/0203234 A1 | 7/2015 | Deleu et al. | |
| 2015/0279245 A1 | 10/2015 | Siekkinen et al. | |
| 2016/0194189 A1 | 7/2016 | Zoni et al. | |

FOREIGN PATENT DOCUMENTS

| | | |
|---|---|---|
| BR | PI0612958 | 12/2010 |
| BR | PI0618604 | 9/2011 |
| CN | 1084870 | 4/1994 |
| CN | 1045615 | 10/1999 |
| CN | 1088230 | 7/2002 |
| CN | 104093636 | 10/2014 |
| DE | 3122633 | 6/1981 |
| EP | 0623659 | 11/1994 |
| EP | 1034218 | 9/2000 |
| EP | 1234865 | 8/2002 |
| EP | 2743324 | 6/2014 |
| EP | 2545132 | 11/2015 |
| EP | 2970725 | 1/2016 |
| JP | 5-78629 | 3/1993 |
| JP | 11-185625 | 7/1999 |
| JP | 2001-034170 | 2/2001 |
| JP | 2002-530510 | 9/2002 |
| JP | 2002-323856 | 11/2002 |
| JP | 2005-157192 | 5/2005 |
| JP | 2008-032940 | 2/2008 |
| JP | 2008-145720 | 6/2008 |
| JP | 2008-298988 | 12/2008 |
| JP | 2012-017377 | 1/2012 |
| WO | 00/31199 | 6/2000 |
| WO | 2012/123814 | 9/2012 |
| WO | 2015/105708 | 12/2014 |
| WO | 2015/157350 | 10/2015 |

OTHER PUBLICATIONS

International Search Report and Written Opinion dated May 15, 2017 issued in corresponding IA No. PCT/US2017/018676 filed Feb. 21, 2017.

International Preliminary Report on Patentability dated Jun. 13, 2018 issued in corresponding IA No. PCT/US2017/018676 filed Feb. 21, 2017.

R.A. Chapman in Handbook of Nonwovens (Year: 2007).

\* cited by examiner

CLEAR EXTENDED CONTENT LABEL WITH SELECTIVELY DETACKIFIED ADHESIVE

CROSS-REFERENCE TO RELATED APPLICATION

The present application is a division of U.S. patent application Ser. No. 15/438,044 filed Feb. 21, 2017, which claims the benefit of U.S. Provisional Patent Application No. 62/298,146 filed Feb. 22, 2016, both of which are incorporated herein by reference in their entireties.

FIELD

The present subject matter relates to methods of producing extended content adhesive label assemblies. The methods utilize an adhesive assembly including a clear face layer, and do not require delamination and relamination of the assembly during production.

BACKGROUND

Various applications and uses are known for extended/expanded content labels. Extended content labels ("ECL") provide a simple and effective means for presenting an increased amount of printed information on a product or its packaging without requiring a corresponding increase in the amount of space on the product or packaging for adhering the label.

Conventional ECLs include an opaque top panel that is either secured directly to the product, or to a base panel that is in turn secured to the product. The top panel includes information printed on its front/outer side, and includes an area of reduced adhesion that can be pulled away from the product to reveal a back/inner side of the top panel having extended content printing thereon.

Conventional methods for producing ECLs utilize previously prepared laminated adhesive articles. The previously prepared laminated adhesive articles typically include an opaque top panel, a release liner, and an adhesive layer laminating the top panel to the release liner. Because these top panels are opaque, conventional ECL manufacturing processes require delaminating the top panel from the release liner to expose the back side of the top panel, followed by back side printing of extended content to the back side of the top panel, and subsequent relamination of the top panel to the release liner. After relamination, front side printing is then applied to a front side of the top panel.

A typical semi-continuous method for producing ECLs is shown for example in FIG. 15, where a previously prepared adhesive assembly web 720 is unwound from an unwind roller 730. The adhesive assembly typically includes a non-transparent (i.e. opaque) top panel, a release liner, and an adhesive layer laminating the top panel to the release liner. The top panel is opaque so that the back side printing does not show through to the front side of the top panel. The adhesive assembly 720 is passed over a delamination plate 750, wherein the release liner 760 is delaminated at 740 from the combination 770 of the face layer and adhesive. The face layer and adhesive combination 770 then passes into a back side printing station 780 wherein extended content printing is applied to the back side (i.e. adhesive side) of the top panel and directly to the adhesive layer. Thereafter, the combination 770 enters a varnish station 790 where a varnish is applied to the adhesive layer to cover the back side printing in order to deaden or reduce the tackiness of the adhesive in that area. The printed face layer and adhesive combination 770 is then relaminated with the release liner 760 at the relamination station 800 to cover the adhesive layer. Although not depicted, typical production methods may include feeding the assembly through a turnbar to flip the assembly to be in the opposite orientation, such as having the face layer facing down. The entire assembly is then fed to a front side printing station 810 where front side printing is applied to the front side of the face layer. The relaminated and printed assembly 820 is then fed to a rewind roller 830 for future processing (e.g. die cutting into individual labels) and application to a substrate.

When applied to a product, the release liner is removed to expose the adhesive layer and the label is adhered to a product. The back side printed area has reduced adhesion due to application of the varnish, which allows the top panel to be pulled from the product in order to reveal the back side extended content printing.

However, production of conventional ECLs requires delamination and relamination, and passing the assembly through a turnbar, and therefore has a limited line speed and can lead to a variety of other processing difficulties. For example, conventional ECL processing requires extra delamination and relamination equipment that necessarily requires additional expenditures and periodic maintenance and repairs. The methods also require that the processing equipment be in a particular configuration. For example, the delamination and relamination equipment must be in close proximity to the back side printing equipment utilized between delamination and relamination. Conventional methods also require equipment operators with more press experience so as to facilitate proper delamination and relamination of the adhesive assemblies. Furthermore, such methods necessarily expose the adhesive layer to the environment, which requires special precautions to be taken in order to avoid contamination of the adhesive layer, and requires cleaning of any equipment that may come into contact with the exposed adhesive layer during production. Another major issue that arises from delamination and relamination, is that the tension on the films have to be carefully controlled so that the finished product is relaminated perfectly to prevent curl to either face layer or liner.

Accordingly, a need exists for a strategy to avoid or at least reduce the potential of these various problems when processing extended content labels, laminates and the like.

SUMMARY

The difficulties and drawbacks associated with previously known practices and technologies are addressed in the present articles, adhesive compositions, systems, and methods.

In contrast to prior art systems, the present subject matter includes extended content labels that include a transparent (e.g. clear) face layer, wherein extended content is applied to a front side of the face layer, rather than to a back side as is conventional. Because the face layer is transparent, when the face layer is peeled from a substrate to which it has been adhered the extended content is visible through the transparent face layer from a back side of the face layer. The present subject matter therefore has the advantage that extended content printing need not be applied to the back side of the face layer. Furthermore, the extended content labels include an adhesive layer that can be selectively treated to modify its level of tack to enable the face layer to be peeled from the substrate. Accordingly, the present subject matter does not require delamination and relamination of the face layer from the release liner in order to print extended content on the label, and therefore the release liner can remain covering the adhesive layer during the entire label production process.

In one aspect, the present subject matter provides a method of producing an extended content adhesive assembly having at least one region of reduced adhesion. The method includes providing a laminated adhesive assembly comprising a face layer defining a front side and an oppositely directed back side, a release liner, and an adhesive layer disposed between the back side of the face layer and the release liner. Extended content indicia is applied to the front side of the face layer. A mask is applied to cover a portion of the adhesive layer. In one embodiment the mask is applied to the front side of the face layer. In another embodiment, the mask is applied to the release liner. The adhesive assembly is then irradiated with radiant energy, wherein the mask substantially blocks a portion of the adhesive layer from exposure to the radiant energy. The radiant energy not blocked by the mask irradiates a region of the adhesive layer to thereby reduce the adhesion of the irradiated region of the adhesive layer. In one embodiment, the radiant energy passes through the face layer, which is substantially transparent to the radiant energy. In another embodiment, the radiant energy passes the release liner, which is substantially transparent to the radiant energy. The indicia is visible from the back side of the face layer and through the adhesive layer, thereby defining extended content.

In another aspect, the present subject matter provides a method of providing extended content on a label. The method comprises providing a laminated adhesive label defining a front side and a back side, and comprising a transparent face layer defining a front side and an oppositely disposed back side. The front side of the face layer is directed toward the front side of the label. The adhesive assembly includes a layer of radiant energy sensitive adhesive disposed at the back side of the face layer. The adhesive is configured to undergo a reduction in adhesion upon exposure to a sufficient amount of radiant energy. The adhesive assembly includes a release liner laminated to the back side of the face layer by the adhesive. The method includes applying indicia to the front side of the face layer; covering a portion of the adhesive layer with a mask; and irradiating the adhesive label with radiant energy. The mask provides a non-irradiated region of the layer of adhesive by substantially blocking radiant energy from reaching the non-irradiated region. Radiant energy not substantially blocked by the mask provides an irradiated region of the layer of adhesive by exposing the irradiated region to a sufficient amount of radiant energy to thereby reduce the adhesion of the irradiated region. The indicia is applied over the irradiated region of the layer of adhesive and the indicia is visible from the back side of the face layer, thereby providing extended content on the label.

In still another aspect, the present subject matter also provides a method of providing extended content on a substrate. The method includes providing a substrate and a laminated adhesive label defining a front side and a back side. The label comprises a transparent face layer, a release layer, and a layer of adhesive laminating the face layer to the release layer. Upon sufficient exposure to radiant energy, the adhesive undergoes a reduction in tack. The method further includes applying indicia to the face layer, the indicia being visible through the face layer and thereby defining the extended content. A mask is applied to cover a portion of the layer of adhesive, and the label is exposed to radiant energy such that radiant energy not blocked by the mask irradiates the adhesive to define an irradiated region of the layer of adhesive that undergoes a reduction in adhesion. The release layer is removed from the label to thereby expose the layer of adhesive, and the label is adhered to the substrate by contacting the layer of adhesive to a surface of the substrate. The reduced adhesion of the irradiated region of the layer of adhesive is configured to allow a portion of the face layer including the irradiated region to be removed from the substrate to expose the extended content.

In still another aspect, the present subject matter provides an extended content adhesive assembly configured to be adhered to an associated substrate. The assembly comprises a transparent face layer defining a front surface and an oppositely disposed back surface, a release liner, and an adhesive layer disposed between the back surface of the face layer and the release liner. The adhesive layer includes a region of reduced adhesion that is configured upon removal of the release liner to form a removable bond with an associated substrate, and a region of non-reduced adhesion that is configured upon removal of the release liner to form a permanent bond with the associated substrate. The assembly also comprises indicia on the front surface of the face layer, the indicia being visible through the face layer from the back surface of the face layer, thereby defining extended content. The assembly includes a floodcoat covering the extended content. In one embodiment, the extended content is at least partially obscured by the floodcoat when viewed from the front side. In another embodiment, the extended content is not visible through the floodcoat when viewed from the front side. Upon bonding the adhesive layer to the associated substrate, a portion of the assembly that includes the region of reduced adhesion is configured to be peeled away from the associated substrate to thereby reveal the extended content. In one embodiment, the peeled away portion of the assembly is configured to re-adhere to the associated substrate.

In yet another aspect, the present subject matter provides a labeled container comprising a container defining an outer surface, and a layered adhesive assembly disposed on and contacting the outer surface of the container. The layered adhesive assembly includes a transparent face layer, a layer of adhesive, indicia, and a floodcoat. The transparent face layer defines a front side and a back side, the front side of the face layer being directed toward a front side of the assembly. The layer of adhesive is disposed at the back side of the face layer, and includes a region of reduced adhesion that is configured to form a removable bond with the outer surface of the container, and a region of non-reduced adhesion that is configured to form a permanent bond with the outer surface of the container. The indicia is positioned over the front side of the face layer and is visible from the back side of the face layer, thereby defining extended content on the label. The floodcoat covers the indicia. In one embodiment, the extended content is at least partially obscured by the floodcoat when viewed from the front side. In another embodiment, the indicia is not visible through the floodcoat from the front side of the label when viewed from the front side. A portion of the assembly that includes the region of reduced adhesion is configured to be peeled away from the associated substrate to thereby reveal the extended content.

In still a further aspect, the present subject matter provides a system for selectively reducing adhesion of an adhesive within a prefabricated adhesive assembly to produce an extended content label. The system comprises a prefabricated adhesive assembly and a source of radiant energy. The prefabricated adhesive assembly includes (i) a face layer which is at least substantially transparent and including a front side and a back side, (ii) a release liner, and (iii) an adhesive layer disposed between the face layer and the release liner, and having a characteristic such that upon sufficient exposure to radiant energy, the exposed adhesive undergoes a reduction in adhesion, (iv) indicia on a front side of the face layer which is visible through the face layer from the back side of the face layer, and (v) a mask positioned to cover at least a portion of the adhesive layer and defining at least one passage region which permits the radiant energy to pass therethrough to the adhesive layer. The source of radiant energy is configured to irradiate the adhesive layer through the at least one passage region in the mask to reduce adhesion of at least a portion of the adhesive layer and thereby produce an extended content label.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter relates to techniques of preparing extended content labels. The present subject matter does not require conventional delamination, relamination, or turnbar operations in order to apply extended content to a previously prepared adhesive assembly or to reduce the adhesion of the adhesive layer. Accordingly, the present methods do not result in exposure of an adhesive layer to the environment, and thereby inhibit contamination of processing equipment with adhesive, which is common in conventional ECL preparation processes.

In several embodiments, the methods generally include using a previously prepared adhesive article comprising a face layer that is at least partially transparent to radiant energy, a release liner or "liner" layer, and an adhesive layer disposed between the face layer and the release liner. The present subject matter provides adhesive compositions for forming the adhesive layer that have characteristics such that upon exposure to certain forms of radiant energy, such as UV light for example, undergo a reduction in adhesion, as typically evidenced as a reduction in its peel adhesion value. Such adhesives will be referred to herein as "radiant energy sensitive adhesives," "sensitive to radiant energy" or "UV-sensitive" or other like term(s).

The methods include applying indicia to a front side of the face layer, opposite the adhesive layer, and therefore do not require delamination of the adhesive article to expose a back side (i.e. adhesive side) of the face layer for application of extended content. Furthermore, the adhesive layer is selectively exposed to radiant energy through the transparent face layer for reducing the tackiness of the adhesive layer, or portions thereof. Therefore, delamination of the adhesive assembly is not required by the present methods and the release liner remains covering the adhesive layer during the entire production process.

As used herein, "extended content indicia," "extended content printing," or "extended content" refers to indicia, printing, or other visual representation that is configured to be seen from a back side of the face layer when the back side of the face layer is exposed, e.g. by peeling the face layer away from a substrate to which it is adhered. As used herein, "front side printing," "front side indicia," or "front side content" refers to indicia, printing, or other visual representation that is configured to be seen from a front side of the face layer.

Figure 1:
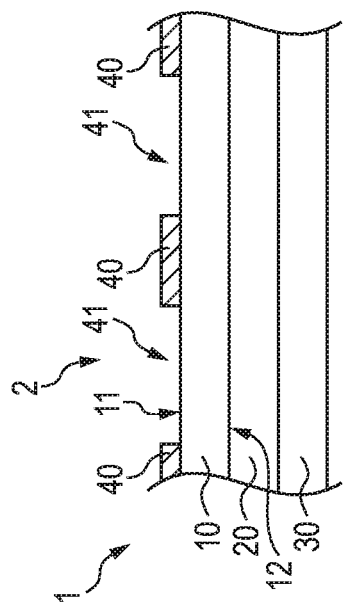
FIG. 1 is a schematic cross sectional view of an embodiment of a prefabricated adhesive assembly in accordance with the present subject matter.

A previously prepared adhesive assembly 1 utilized in the present methods is shown for example in FIG. 1, and includes a face layer 10, a layer of radiant energy sensitive adhesive 20, and a release liner 30. The face layer 10 defines oppositely directed sides (i.e. front side 11 and back side 12), and the adhesive assembly 1 defines oppositely directed sides (i.e. front side 2 and back side 3). The front side 11 of the face layer 10 is directed toward the front side 2 of the assembly 1, and the back side 12 of the face layer 10 is directed toward the back side 3 of the assembly 1. As shown, the adhesive layer 20 is in contact with the face layer 10 and the release liner 30. It will be understood however, that the adhesive assemblies and extended content labels of the present subject matter may also include one or more additional layers or other components not shown in the Figures, including one or more intervening layers among and/or between the depicted layers.

The methods include applying indicia on the front side of the face layer, such indicia being configured to be seen from a back side of the transparent face layer when the face layer is pulled away from a substrate to which it is adhered, thereby providing the extended content to the label.

The methods also include positioning a mask between the adhesive layer and a source of radiant energy. The mask is substantially non-transparent to the radiant energy. The adhesive layer is then exposed to radiant energy by transmitting radiant energy through apertures in the mask to portions of the radiant energy sensitive adhesive layer, thereby reducing the adhesion of the irradiated portions of the adhesive layer. Non-irradiated portions of the adhesive layer, which are covered by the mask, substantially retain their original level of adhesion.

It will be understood that other layers, besides the face layer of the adhesive assembly may be transparent to radiant energy. In this respect, the layer (e.g. the face layer) through which the radiant energy passes in order to reduce the adhesion of the adhesive layer, must have at least some level of transparency to the radiant energy. For materials or layers having relatively low transparency, a more intense energy source, longer exposure time, and/or slower line speed, or combinations thereof could be utilized. For example, if a layer under review only transmitted 50% of the radiant energy, that deficiency could be compensated for by doubling the intensity of the energy source, or by reducing the line speed by a factor of 2, or by a combination of these techniques. As used herein, the terms "transparent," "transparency," or similar terms refer to a material, medium, layer, substance, or the like that is not completely opaque to the radiant energy used, and therefore allows some portion of the radiant energy to pass therethrough. Transparent materials conventionally appear clear and do not appreciably scatter light rays transmitted therethrough. However, as used herein, "transparent" materials also include translucent materials, which appear slightly hazy or of low clarity, indicating that the material is scattering light rays transmitted therethrough but is not completely opaque.

Provided at least one layer (e.g. the face layer) in the various articles and laminated adhesive assemblies of the present subject matter is sufficiently transparent, other layers (e.g. the release liner, floodcoat) may optionally be substantially opaque. The various articles and adhesive assemblies of the present subject matter comprise (i) one or more layers of a material that is sufficiently transparent to permit the passage of select radiant energy therethrough, and (ii) one or more layers of a radiant energy sensitive adhesive as described herein in greater detail.

In many embodiments, and as described in greater detail herein, one or more layers, for example two layers, in a layered assembly which are disposed immediately adjacent to the adhesive layer or region are at least partially transparent to the passage of radiant energy. For example, referring to the adhesive assembly 1 depicted in FIG. 1, one or both of the face layer 10 and the liner 30 are at least partially transparent such that the layer(s) allow radiant energy to pass through the respective layer(s) to the adhesive. The extent of transmittance of the radiant energy is such that the adhesive undergoes a reduction in adhesion level. The mask may be applied before or after the extended content indicia is applied. In several embodiments, the extended content may be applied in an amount that may substantially block the radiant energy from being transmitting to the adhesive layer. In these embodiments, the mask may be applied and the assembly may be irradiated with radiant energy before the extended content is applied to the assembly. In other embodiments, the extended content may not substantially block the radiant energy. In these embodiments, the mask may be applied and the assembly may be irradiated with radiant energy before or after the extended content is applied to the assembly.

In embodiments where the radiant energy is transmitted through the face layer to the adhesive layer, a floodcoat is applied to the front side of the face layer after irradiation. The floodcoat is applied to cover/obscure the extended content indicia so that the extended content is not visible from the front side of the label. Front side indicia is then applied over the floodcoat to produce an extended content label. The floodcoat can be applied at any coat weight or in any number of layers in order to completely or partially hide the extended content as desired.

The extended content label can then be applied to a substrate, such as a product, package, container, or base panel, by exposing the adhesive layer and contacting the exposed adhesive layer to the substrate. The non-irradiated portion of the adhesive layer maintains its original adhesion and forms a stronger adhesive bond with the substrate, while the irradiated portion of the adhesive layer has decreased adhesion and forms a weaker, removable bond with the substrate. Accordingly, the portion of the face layer including the irradiated, reduced adhesion portion of the adhesive layer, can be pulled away from the substrate to reveal the back side of the face layer so that the extended content can be viewed. The portion of the face layer including the non-irradiated portion of the adhesive layer remains bonded to the substrate, and thus acts as a type of hinge so the entire face layer is not completely pulled off the substrate.

The adhesive assemblies of the present subject matter can be prefabricated at a time or place remote from the front and back side printing operations, or can be prepared in line with the printing operations. In the present disclosure, "prefabricated" or "previously prepared" adhesive assemblies means assemblies in which the back side of the face layer is not exposed because it is laminated to, or is covered by other layers of the adhesive assembly, e.g. the release liner. Because it is covered, the back side of the face layer is not configured to easily accept indicia, such as by printing, without first delaminating the face layer from other layers to which it is laminated. In accordance with the present subject matter, prefabricated assemblies include for example, a face layer being laminated by the adhesive layer to the release liner, as shown in FIG. 1.

The present subject matter also provides various extended content labels, combinations of extended content labels adhered to substrates, and systems, methods and processing equipment for producing extended content labels. Other equipment, methods, and applications are also contemplated pursuant to the present subject matter. These and other aspects are described in greater detail herein.

Face Layer

The present subject matter includes providing prefabricated adhesive assemblies comprising a face layer, a release liner, and a layer of radiant energy sensitive adhesive disposed between the face layer and the release liner.

In several embodiments, the face layer is transparent (e.g. clear) and provides a platform upon which the extended content indicia, mask, floodcoat, and front side indicia are applied for producing extended content labels. For example, the extended content indicia may be applied directly to a front side of the face layer. The face layer and the extended content indicia are configured such that the extended content is visible from the back side of the face layer and through the transparent face layer. Furthermore, adhesion of the adhesive layer is selectively reduced by transmitting radiant energy through a transparent material (e.g. the face layer or release liner) to portions of the adhesive layer. Because the extended content is not applied to the back side of the face layer, and because the adhesion of the adhesive layer is reduced by radiant energy, delamination of the prefabricated adhesive assembly is not required for printing the extended content and for preparing ECLs.

Figure 2:
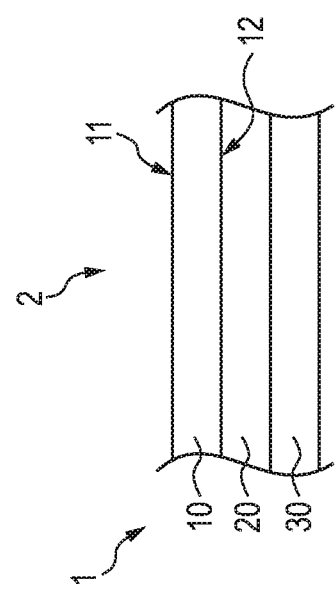
FIG. 2 is a schematic cross sectional view of the prefabricated adhesive assembly of FIG. 1, having a mask applied thereto in accordance with the present subject matter.
Figure 3:
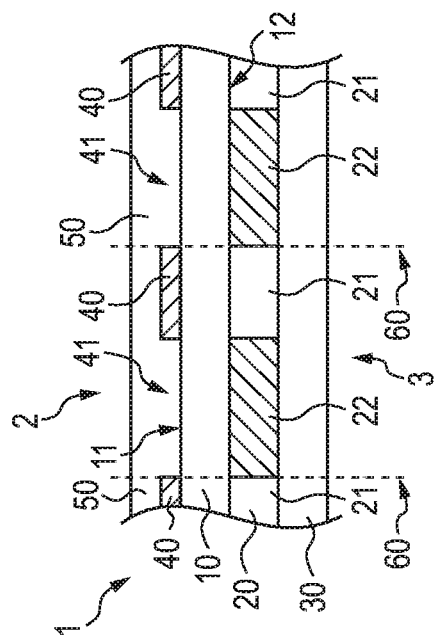
FIG. 3 is a schematic cross sectional view of the prefabricated adhesive assembly of FIG. 2 after exposure to radiant energy in accordance with the present subject matter.

In one embodiment, and with reference to FIGS. 1-3 for example, the adhesive assembly 1 includes a face layer 10 that is at least partially transparent to the passage of radiant energy and is clear so that extended content can be seen through the face layer 10 from the back side 12. Radiant energy is directed toward the assembly 1 from the front side 2 of the assembly 1, and through apertures 41 in a mask 40. The radiant energy then at least partially transmits through the transparent face layer 10 to the adhesive layer 20, thereby irradiating portions 22 of the adhesive layer not covered by the mask 40, and reducing the adhesion of the irradiated portions 22 of the adhesive layer 20.

In this embodiment, the release liner 30 may or may not also be at least partially transparent to radiant energy. If the release liner is also at least partially transparent to radiant energy, then adhesion of the adhesive layer may be reduced by also transmitting radiant energy through the release liner, with or without using a mask. In one aspect of this embodiment where the radiant energy is transmitted through the face layer to the adhesive layer, the release liner is substantially non-transparent (i.e. opaque) to the radiant energy.

The face layer is not particularly limited by the present subject matter and a wide array of materials can be used for the transparent or substantially transparent material. Non-limiting examples of light transmissive polymeric film materials include for example cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, cyclic olefin copolymers, polyethylene naphthalate, and copolymers or blends based on naphthalene dicarboxylic acids. Optionally, the film can contain suitable mixtures or combinations of these materials. In certain embodiments, a transparent face film of polyethylene terephthalate (PET) or biaxially oriented polypropylene (BOPP) is used. The face layer may have a thickness from about 5 microns to about 100 microns or more, and optionally about 10-50 microns, or about 10 microns.

In an alternative embodiment, the radiant energy is transmitted to the adhesive layer through the release liner, which is at least partially transparent to the passage of radiant energy. In this embodiment, a mask is positioned on the back side of the adhesive assembly, and a radiant energy source is directed at the adhesive assembly from the back side of the assembly. Radiant energy transmits through apertures in the mask and through the transparent release liner, thereby irradiating a portion of the adhesive layer causing a reduction in tack in the irradiated portion of the adhesive layer. In this embodiment, the face layer may or may not also be at least partially transparent to radiant energy. If the face layer is at least partially transparent to radiant energy, then the adhesion of the adhesive layer may be reduced by transmitting radiant energy through both of the release liner and the face layer using a mask positioned at the front side of the assembly. The mask at the front side of the assembly may have the same design as the mask on the back side of the assembly so as to block the same portions of the adhesive layer from exposure to radiant energy as that blocked by the mask at the back side of the assembly.

Adhesive Layer

In accordance with the present subject matter, the prefabricated adhesive assemblies include an adhesive layer that is sensitive to radiant energy, and positioned at the back side of the face layer. The adhesive layer may contact the face layer, the release liner, or both. With reference to FIGS. 1-3, the adhesive layer 20 is positioned between the face layer 10 and the release liner 30. The adhesive layer is substantially transparent, such that extended content indicia applied to the front side 11 of the face layer 10, is visible through the face layer 10 and through the adhesive layer 20 from the back side 12 of the face layer 10.

The methods include deadening, or at least partially reducing the adhesion of an adhesive layer using radiant energy, such as UV light and/or electron beam (periodically referred to as "ebeam" energy), so that the irradiated portion of the adhesive layer displays reduced adhesion with substrates. In certain embodiments, a layer of UV-sensitive adhesive is exposed to UV light for a certain time period to thereby reducing the adhesion the adhesive. Doing so reduces the amount of delamination or separation force required to separate adjoining regions of an assembly, label or other laminates, and thereby provides easy peeling of a portion of the face layer from a substrate to reveal extended content on the label. Adhesion in selected regions of the adhesive layer can be reduced by directing radiant energy through either or both of the face layer or the release liner of a prefabricated adhesive assembly.

The present subject matter also provides specific adhesive compositions that are sensitive to radiant energy, and particularly UV-sensitive adhesive compositions. The adhesives can use certain functionalized polymers as described herein to provide a UV-sensitive pressure sensitive adhesive (PSA).

Sources of UV light include high pressure, medium pressure, and low pressure mercury lamps, optionally doped with additives to adjust the emission spectrum, and LEDs emitting in the range 200-400 nm. Other sources of UV light are also suitable. In describing the extent of exposure to radiant energy, the term "dose" can be used. "Dose" refers to the total amount of applied energy. For ultraviolet light, the units are of the form "energy per area," for example, $mJ/cm^2$ or $kJ/m^2$. In electron beam curing, dose is also a measure of applied energy, but it is traditionally measured on a mass basis: J/kg, which is called a "Gray," with abbreviation Gy. In either case, dose can in many applications be an important parameter. The dose is a function of the intensity of the UV or ebeam source, the relative transparency of any intervening materials, and how long the sample is exposed to the source. Higher intensity, higher transparency or longer exposure time, means a higher dose. In many applications, the adhesive is moved past a fixed radiant energy source, so that the speed of motion determines the time under the source. In these cases faster speed corresponds to lower dose. If dose is held constant, the intensity of the energy source and the corresponding time needed to apply the dose matters, but this is a minor effect to that of the overall dose. Typically the dose is applied all at once by passing under a single energy source or in rapid succession by a series of energy sources under which the same passes, with the total exposure time measured in seconds or fractions of seconds. However, as long as the intensity during each exposure is above a certain threshold, in principal the dose can be applied in multiple exposures separated by minutes or even hours.

UV exposure doses can be measured using a dosimeter such as the UV Power Puck II from EIT LLC. The sensor of the dosimeter must be covered with a sample of the at least partially transparent layer to properly measure the UV dose actually delivered to the adhesive layer. When measured in this manner preferred doses are at least 500 mJ/cm$^2$ in a UV wavelength range appropriate to the one or more photoinitiators. More preferred are at least 250 mJ/cm$^2$ and most preferred are at least 150 mJ/cm$^2$.

With reference to FIGS. 1-3, a portion 21 of the adhesive layer 20 is covered by the mask 40 that is substantially non-transparent to radiant energy, and thus the portion 21 covered by the mask 40 is not exposed to radiant energy. The non-irradiated portion 21 maintains its original adhesion, and can therefore be used as a type of hinge to securely adhere (e.g. by a permanent adhesive bond) the face layer to a substrate, such as a base layer, package, container, or product. Apertures 41 in the mask 40 allow radiant energy to irradiate other portions 22 of the adhesive layer 20. The irradiated portions 22 of the adhesive layer 20 have a reduced have reduced adhesion with a substrate, which allows a portion of the face layer 10 that includes the irradiated portions 22 to be pulled from the substrate to view the back side 12 of the face layer 10 and to view the extended content through the transparent face layer 10.

The irradiated portion 22 of the adhesive layer 20 may correspond to the portion of the face layer 10 that includes the extended content indicia. In other words, the extended content indicia is applied to portions of the face layer that will include the irradiated portion 22 of the adhesive layer 20. In this way, the portion of the face layer including the extended content indicia can be easily pulled from a substrate to reveal the extended content. The non-irradiated potion of the adhesive layer can provide a stronger bond, e.g. a permanent bond, with the substrate, thereby making it difficult to completely remove the face layer from the substrate.

In many embodiments the adhesive compositions in the adhesive layers are UV-sensitive adhesives that undergo a reduction in adhesion upon exposure to UV radiation. The present subject matter includes adhesive compositions that undergo reductions in adhesion upon exposure to other forms of radiant energy, such as electron beam.

In particular embodiments, the present subject matter provides emulsion pressure sensitive adhesive compositions which have properties that can be selectively adjusted after drying and film formation. As described herein, typically such adjustment is performed by exposure to radiation such as UV light or from an electron beam. In many embodiments of the present subject matter, the reduction in adhesion is accomplished by free-radical polymerization, which crosslinks the polymer. This increases the gel content of the adhesive, which has the effect of reducing adhesion.

The adhesive compositions generally comprise emulsion particles. The polymers of the present subject matter adhesive are prepared by treating an emulsion polymer which includes carboxylic acid functional monomers with an ethylenically unsaturated monomer including an epoxy group in the presence of a suitable catalyst.

Suitable emulsion polymers can be prepared via many different processes known in the art, such as emulsion polymerization, multistage emulsion polymerization, miniemulsion polymerization, or dispersion of an existing polymer in water.

Emulsions suitable for the present subject matter may have particle sizes from 50 nm to 1000 nm. In certain embodiments, the particle sizes are from 75 to 700 nm. And, in still other embodiments, the particle sizes are from 200 to 500 nm.

Emulsions suitable for the present subject matter should exhibit pressure sensitive adhesive behavior at the intended use temperature prior to cure. Pressure sensitive adhesives are generally defined as materials which exhibit permanent tack at the intended use temperature. Pressure sensitive adhesives originate from a film forming, elastomeric material which combines a high level of tack with an ability to quickly wet the surface to which it is applied. Pressure sensitive adhesives provide fast bonding at low to moderate pressure as a result of their flow characteristics. Pressure sensitive adhesives also exhibit sufficient cohesion and elasticity so that they can be handled and removed from smooth surfaces without leaving any residue.

Suitable polymers for the present subject matter will have glass transition temperatures which result in pressure sensitive adhesive behavior at the intended application temperature. It is well known in the art to control glass transition temperature by, for example, monomer selection and/or proportions of monomers in copolymers.

Suitable carboxylic acid monomers for the present subject matter include acrylic acid, methacrylic acid, itaconic acid, citraconic acid, acryloxypropionic acid, maleic acid, methacryloxyisopropyl acid phthalate, methacryloxyethyl acid phthalate, acryloxyisopropyl acid phthalate and acryloxyethyl acid phthalate. Combinations of carboxylic acid monomers may be used. Suitable amounts of carboxylic acid monomers range from 1 to 20 percent based on total monomer. In certain embodiments, the amount of carboxylic acid monomers is within a range of from 2 to 12 percent. In particular embodiments, the amount of carboxylic acid monomers is within a range of from 3 to 10 percent. Also contemplated are monomers which may be converted to contain carboxylic acid groups, such as anhydride monomers such as maleic anhydride or readily hydrolyzed ester containing monomers such as methyl acrylate.

Ethylenically unsaturated monomers containing epoxy groups suitable for the present subject matter include glycidyl methacrylate, glycidyl acrylate, acrylated epoxidized soybean oil, allyl glycidyl ether and 3,4-epoxycyclohexyl methyl methacrylate. Combinations of epoxy functional monomers may be used. Suitable amounts range from 0.05 to 1 equivalents of epoxy to each equivalent of carboxylic acid monomer. In particular embodiments, the amount of epoxy functional monomers is from 0.1 to 0.8 equivalents. In still other embodiments, the amount of epoxy functional monomers is from 0.2 to 0.7 equivalents.

Suitable catalysts include tetrabutyl ammonium hydroxide, methyl tributyl ammonium hydroxide, ammonium hydroxide, tetrabutyl ammonium chloride, methyltributyl ammonium chloride, triphenyl phosphine, and chromium acetate. Other catalysts suitable for reacting epoxies and carboxylic acids may also be used, and combinations of catalysts may be used.

It may be desirable to add an inhibitor to prevent polymerization of the ethylenically unsaturated epoxy functional monomer or premature cure of the resulting functionalized latex. Suitable inhibitors include hydroquinone, methoxyhydroquinone, butylated hydroxy toluene, phenothiazine, TEMPO and 4-hydroxy TEMPO (also known as "4HT"). Combinations of inhibitors may be used. Suitable inhibitor levels are 10 to 3000 ppm. In certain embodiments, the concentration of inhibitors is 20 to 2000. In particular embodiments, the concentration of inhibitors is 50 to 1000 ppm.

The polymers of the present subject matter may be cured by free radical polymerization using methods well known to those skilled in the art. Suitable methods include heating in the presence of a thermal free radical initiator, exposing to electromagnetic radiation, e.g. ultraviolet radiation, in the presence of a photoinitiator, or exposure to an electron beam or gamma radiation. In certain embodiments, the polymers are cured by exposure to ultraviolet light or electron beam.

Suitable photoinitiators for use with the present subject matter include benzophenone and benzophenone derivatives, thioxanthone and thioxanthone derivatives such as isopropyl thioxanthone and chlorothioxanthone, aryl phosphine oxides such as 2,4,6-trimethylbenzoyldiphenylphosphine oxide and phenyl bis(2,4,6-trimethylbenzoyl)-phosphine oxide, benzoin and benzoin derivatives, benzil ketals such as Irgacure 651, acetophenone and acetophenone derivatives such as Irgacure 184, Irgacure 369.

For certain applications, it may be desirable to use a "polymeric" photoinitiator with sufficiently high molecular weight to minimize any material extracting into for example food. Suitable polymeric photoinitiators include Esacure One from Lamberti, Genopol TX-1, Genopol AB-2, Genopol BP-2 from Rahn and Omnipol BP Omnipol SZ, and Omnipol TX from IGM Resin.

Other photoinitiators known to those skilled in the art are also suitable. It is also contemplated the mixtures of photoinitiators may be used.

Although the present subject matter has been described in association with emulsion pressure sensitive adhesives, it is contemplated that in certain applications it may be possible to use a hot melt pressure sensitive adhesive having suitable curing characteristics. It is also contemplated that pressure sensitive adhesives based upon solution polymers, i.e., solution polymer pressure sensitive adhesives, could also be used in accordance with the present subject matter.

In certain applications, it may be necessary or at least desirable to protect the system, articles, and/or adhesive compositions from ambient UV light such as that from sunlight. However, the intensity of ambient UV is much lower than is typically used in UV processing. Two factors protect from unintended tack reduction under such weak exposures. One factor is that oxygen inhibits the tack reduction chemistry. Ambient air contains enough oxygen to suppress the adhesion reduction until a certain limiting light intensity is reached. While the adhesion-reducing threshold depends on many factors, in practice, sunlight is far below the threshold. Another factor relates to use of a free-radical stabilizer which can be added to the formulation which provides additional protection from low level UV exposure. Many such stabilizers are known in the art. An example of such is 4-hydroxy TEMPO ("4HT"), used at 200 to 2,000 ppm.

In accordance with the present subject matter, the reduction in adhesion can be specified relative to the adhesion prior to exposure to radiant energy. The present subject matter includes a reduction in adhesion of from 1% to 99%. For many applications, suitable reductions in adhesion are greater than 30%. Typically, reductions in adhesion are greater than 50%. And in certain embodiments, reductions in adhesion are greater than 75%. In particular embodiments, reductions in adhesion are greater than 90%. All of these reductions in adhesion are relative to the initial adhesion of the subject adhesive prior to exposure to radiant energy. The minimum reduction in adhesion will be a function of the specific application, the strength of the facestock used, and the starting adhesion of the adhesive. Adhesion can be quantified using a number of different tests or procedures. A typical method is Method PSTC-101 from "Test Methods for Pressure Sensitive Adhesive Tapes," 15$^{th}$ Edition, from the Pressure Sensitive Tape Council. This method is typically referred to as "Peel Adhesion" by those in the art.

The present subject matter includes exposing the adhesive to radiant energy prior to label application, during label application, after label application, or any combination thereof. For example, a label having adhesive as described herein which can have its adhesion reduced or deadened upon a sufficient amount of exposure to radiant energy, can be applied to a substrate. After application, peeling a portion of the label from the substrate in order to reveal the extended content can be promoted by exposing the adhesive to radiant energy. Such exposure can be performed by directing radiant energy through the face layer and/or release liner, along the interface between the label and the substrate, and/or by directing radiant energy through the substrate (e.g. a clear bottle) to which the label is adhered, i.e., towards the back side of the label.

Alternatively, a conventional adhesive can be used to define a portion of the adhesive layer that forms a permanent bond with a substrate and is used as a hinge for the face layer, wherein a mask would not be required to cover the conventional adhesive because it would not lose tackiness upon exposure to radiant energy.

It will be understood that the present subject matter includes a wide array of different configurations of ECLs having one or more regions or areas of reduced adhesion, and is not limited in any manner to the particular embodiments described herein or shown such as in the figures. Furthermore, in many embodiments, the adhesive region(s) or layer(s) to be modified are located within the interior of a prefabricated adhesive assembly and thus are bounded by other layers such as a face layer and a liner. However, the present subject matter also includes selectively reducing the adhesion of adhesive region(s) or area(s) that are exposed and not covered by one or more opaque layers. In addition, the present subject matter also includes selectively reducing the adhesion of edge regions of the adhesive layer.

Release Liner

In accordance with certain embodiments, and with reference to FIGS. 1-3, the prefabricated adhesive articles 1 includes a release liner 30 covering the adhesive layer 20. The release liner may contact the adhesive layer or may have a coating or treatment material positioned therebetween. The release liner typically remains covering the adhesive layer during and after preparation of the extended content label, including during application of the extended content indicia at the front side 11 of the face layer 10. Although not required, the release liner may optionally be removed during preparation of an extended content label. Prior to applying the extended content label to a substrate, the release liner is removed from the extended content label to expose the adhesive layer.

The release liner is used to prevent premature exposure of the adhesive layer to the surrounding environment by protecting against contamination of the adhesive from dirt, liquids, or other elemental exposure. Inadvertent contact or exposure to environmental elements can undesirably contaminate adhesive layer, and prevent the desired adhesion to various substrates. Furthermore, the release liner protects processing equipment from contacting the adhesive, thereby inhibiting adhesive contamination of the equipment.

The release liner also allows for more aggressive handling of the adhesive assembly and label prior to application to a substrate. For example, the release liner provides protection for the assembly and label during printing, converting, packaging, handling, or shipping. Handling of the assembly or label can include passing the assembly or label through converting equipment such as rollers, printing on the labels, die cutting individual labels from a roll, packaging the labels, and other manufacturing processes. The release liner provides stiffness to the adhesive assembly to facilitate these steps. The release liner may cover all or a portion of the adhesive layer.

Typical liner materials suitable for use include for example, super calendered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic acid; ethylene methyl (meth)acrylate; ethylene butyl acrylate; polypropylene; ethylene/propylene copolymers; and impact resistant ethylene/propylene copolymers and combinations thereof.

The release liner may utilize silicon-containing and/or fluorine-containing materials as a release agent. The silicon-containing and/or fluorine-containing component of the release liner may contact the adhesive layer. The silicon-containing and/or fluorine-containing material allows the release liners to separate easily from the adhesive when the extended content labels are to be applied to a substrate. The silicon-containing and/or fluorine-containing material does not strongly adhere to the adhesive and thus provides a releasable interface with the underlying adhesive while providing protection from contamination of the adhesive layer.

The release liner may have a thickness from about 5 microns to about 100 microns or more, and optionally about 10-50 microns, or about 10 microns.

As discussed herein, in several embodiments the mask is positioned at the front side of the adhesive assembly and radiant energy is directed through a substantially transparent face layer to the adhesive layer. In these embodiments, the release liner may be substantially non-transparent, e.g. substantially opaque, to radiant energy. Non-limiting examples of substantially opaque material for use as the release liner include papers, polymeric films, cavitated films such as cavitated BOPP, metallic coatings and foils, and paper or polymer films with dispersed fillers, inks, paints, or pigments.

Figure 14:
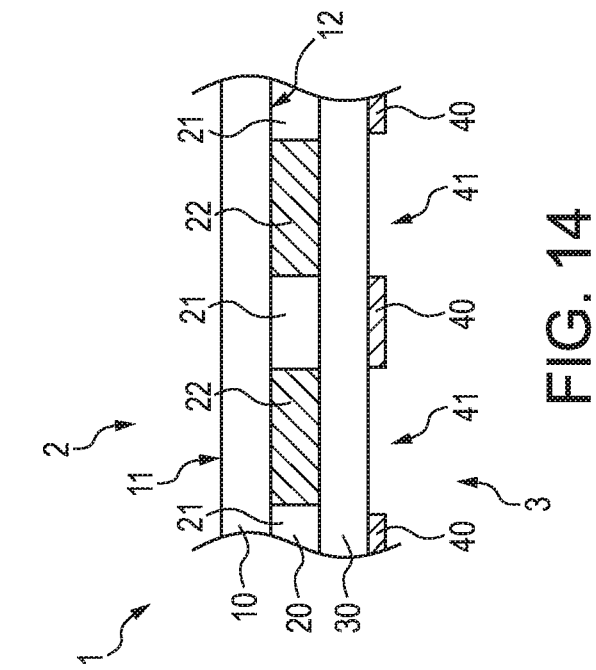
FIG. 14 is a schematic cross sectional view of another prefabricated adhesive assembly having a mask applied thereto and after exposure to radiant energy in accordance with the present subject matter.
Figure 15:
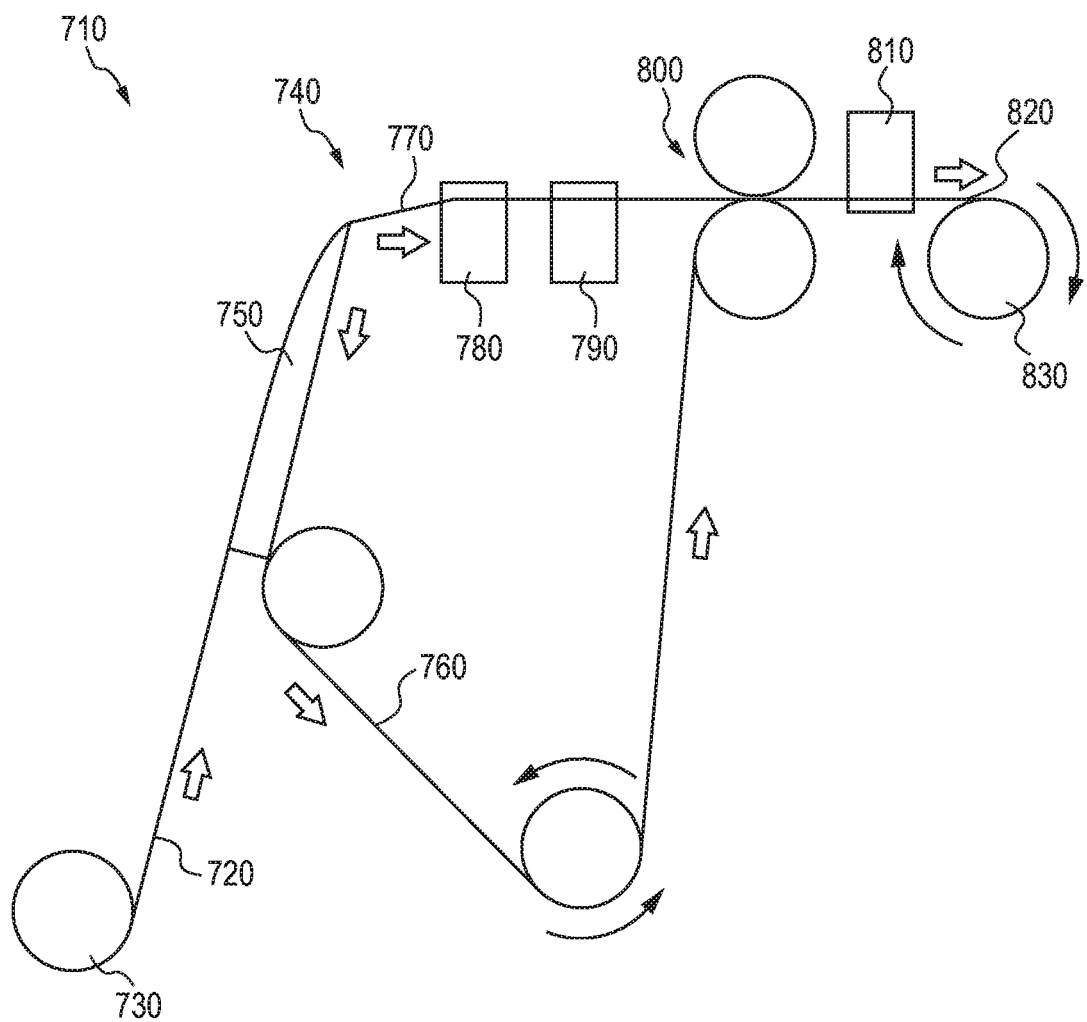
FIG. 15 is a process schematic illustrating a prior art system and method for producing extended content labels.

In another embodiment as shown in FIG. 14, the release liner 30 may be substantially transparent to radiant energy, wherein the mask 40 is positioned at the back side 3 of the adhesive assembly 1 and radiant energy is directed through apertures 41 in the mask 40, through the release liner 30, and to the adhesive layer 20 to thereby define irradiated portions 22 and non-irradiated portions 21 of the adhesive layer 20. In this embodiment, the release liner may be substantially transparent to the radiant energy in order to allow a portion of the adhesive layer to be irradiated with radiant energy.

In embodiments where the release liner is substantially transparent to the radiant energy, nonlimiting examples of light transmissive polymeric film materials include cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, cyclic olefin copolymers, polyethylene naphthalate, and copolymers or blends based on naphthalene dicarboxylic acids.

Extended Content Printing

In various embodiments, indicia is applied to the front side of the face layer and is configured to be visible through the clear/transparent face layer from the back side of the face layer, thereby defining the extended content on the label. The extended content indicia can comprise letters, numbers, shapes, designs, images, and other visual representation, or combinations or portions thereof. The extended content indicia can comprise any number of colors or combination of colors. The extended content indicia can have eggshell, sheen, sheer, satin, iridescent, shimmer, reflective, and holographic effects, or other effects, and combinations thereof. The extended content indicia can be substantially flat, or can be raised or three dimensional.

With reference to FIGS. 1-3, the extended content indicia is applied to the front side 11 of the face layer 10. For simplicity, the extended content indicia are not shown in the accompanying figures. However, it will be understood that in FIGS. 1-3, the extended content indicia is included at the front side 11 of the face layer 10. The extended content indicia may contact the front side 11 of the face layer 10, or may be spaced therefrom. The face layer 10 and adhesive layer 20 are substantially transparent, such that the extended content indicia is visible from the back side 12 of the face layer 10 when the back side of the face layer is exposed, for example upon peeling the release liner away from the adhesive layer, or when the face layer is peeled from a substrate to which it is adhered.

In one embodiment, the extended content indicia comprises reverse printing, wherein the indicia is applied on the front side 11 of the face layer 10 in an orientation that is reverse from the orientation of the indicia as seen from the intended viewing position from the back side 12 of the face layer 10. More specifically, the image formed by the indicia when viewed from the front side of the face layer, is reversed from the intended image when viewed from the back side 12 of the face layer 10 as extended content. For example, the extended content indicia may comprise letters printed in reverse order and in reverse orientation, so that when viewed from the back side of the face layer the letters appear as regularly printed words.

In several embodiments, the extended content indicia substantially blocks the radiant energy from reaching the adhesive layer. In these embodiments, the adhesive layer may be irradiated before the extended content is applied to the assembly. In other embodiments, the extended content indicia does not substantially block the radiant energy from reaching the adhesive layer. Accordingly, the radiant energy that passes through apertures in the mask is not substantially blocked by the extended content indicia, but instead irradiates a portion of the adhesive layer under the extended content indicia for reducing the tackiness of the irradiated portion of the adhesive layer. In one aspect, the extended content indicia is substantially non-transparent to radiant energy, but covers such a small portion of the front side of the face layer that the extended content indicia does not substantially block the radiant energy from reaching the underlying adhesive layer. In another aspect, the extended content indicia is substantially transparent to radiant energy, and therefore does not substantially block the radiant energy from reaching the adhesive layer.

In another embodiment, extended content indicia is applied to the back side of the face layer before the adhesive assembly is prefabricated.

The material used to form the extended content indicia is not particularly limited by the present subject matter, and may comprise pigments, dyes, inks, paints, or other colorants, which can be applied to either or both sides of the face layer by flexographic, rotogravure, screen printing, spraying, brushing, offset, or digital printing techniques, as non-limiting examples.

Mask

In various embodiments, a mask is positioned between the adhesive article and the radiant energy source. Depending on the location of the radiant energy source and which layers of the adhesive assembly are transparent to radiant energy, the mask may be applied over the face layer, over the release liner, or positioned stationary relative to the radiant energy source, and combinations thereof. The mask can take any form so as to produce a desired size and shape of the irradiated portion of the adhesive layer. As such, the mask can be patterned or random, semi-continuous or discontinuous, or any other configuration as desired.

The mask is used to at least partially block, or substantially block radiant energy from reaching certain portions of the adhesive layer. To accomplish this, the mask is at least partially opaque, or substantially so, and can be of any color, including white or black for example. In one embodiment, the mask is substantially opaque to radiant energy.

In regions of the adhesive layer that are intended not to be modified, the mask is configured to keep exposure from the UV light or other radiant energy below a threshold for adhesion reduction. Radiant energy not blocked by the mask passes through apertures in the mask, through the face layer or other transparent layer (e.g. the release liner), and irradiates portions of the adhesive layer to a level above the threshold for adhesion reduction. In accordance with the present subject matter, the mask is positioned between the radiant energy source and the adhesive layer, and may be applied to the face layer, to the release liner, or spaced from the adhesive assembly.

In one embodiment and with reference to FIGS. 1-3, the mask 40 is applied over the face layer 10. As shown, the mask 40 is applied to the front side 11 of the face layer 10 to define at least one aperture 41 through which radiant energy can be transmitted to the adhesive layer 20. In another embodiment and with reference to FIG. 14, the mask 40 is applied over the release liner 30. As shown, the mask 40 is applied to the back side 3 of the assembly 1 to define at least one aperture 41 through which radiant energy can be transmitted to the adhesive layer 20.

In another embodiment, the mask comprises a substantially continuous layer without apertures, and includes area(s) of higher and lower transparency to radiant energy. As such, the areas of higher transparency will allow more radiant energy to reach the underlying adhesive layer to reduce the adhesion of that portion of the adhesive layer, while the areas of lower transparency will inhibit or completely block the transmission of radiant energy to the adhesive layer.

As will be understood, in many applications it is desirable to position the mask relatively close to, and in certain embodiments immediately adjacent to the adhesive assembly to reduce parallax error. In particular embodiments of the present subject matter, the mask is in contact with the adhesive assembly.

The material used to form the mask is not particularly limited by the present subject matter, and can include liquid material such as inks and paints, or solid material such as paper, polymeric films, and metal foils for example, that sufficiently blocks the radiant energy to be below the threshold for adhesion reduction. In accordance with the present subject matter, the mask may be formed using flexographic UV-curable ink, flexographic water-based ink, flexographic solvent-based ink, inks used in screen printing, inks used in digital printing (i.e. inkjet or laserjet), combinations thereof, or any other type of ink, paint, or coating. The coat weight of the mask depends on the level of transparency/opacity to radiant energy of the material used to form the mask. The mask is applied at a coat weight sufficient to block radiant energy to be at a level below the threshold for adhesion reduction. When inks are used to form the mask, the coat weight may depend on the pigment load and density of the inks. The mask and floodcoat may comprise the same material.

Figure 12:
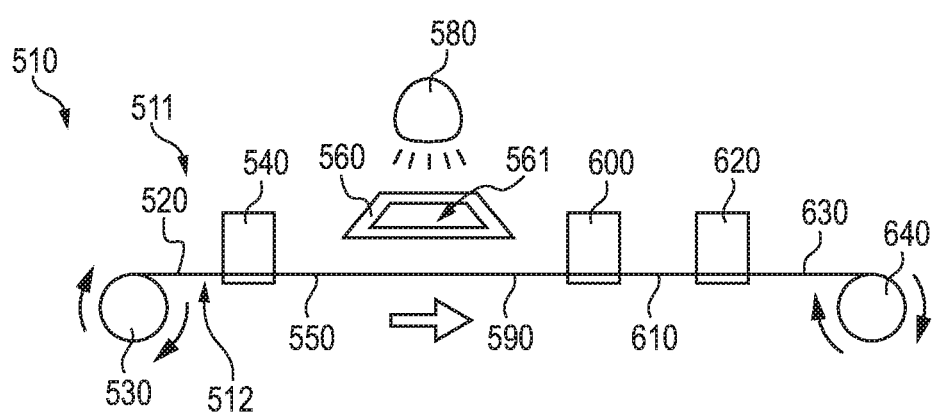
FIG. 12 is yet another process schematic illustrating a system and method in accordance with the present subject matter.

The mask may be applied directly to the adhesive article (e.g. FIGS. 2-9, 13, and 14), or may be spaced a distance from the adhesive article and secured relative to the radiant energy source (e.g. FIG. 12).

In several embodiments, the mask is positioned at a front side of the adhesive assembly between the radiant energy source and the adhesive layer. In these embodiments, the radiant energy is directed toward the front side of the face layer, which is at least partially transparent to radiant energy. The mask blocks a portion of the radiant energy from reaching the adhesive layer. Apertures in the mask allow a portion of the radiant energy to transmit through the face layer to irradiate a portion of the underlying adhesive layer. In one aspect, the mask is applied directly to the front side of the face layer. In another aspect, the mask is spaced from the front side of the face layer, e.g. where one or more intervening layers are positioned therebetween or where the mask does not contact the adhesive assembly. In still another aspect, the mask is positioned between the face layer and the adhesive layer.

In other embodiments, the mask is positioned at a back side of the adhesive assembly between the radiant energy source and the adhesive layer. In these embodiments, the radiant energy source is positioned at the back side of the adhesive assembly and directed toward the release liner, which is at least partially transparent to radiant energy. The mask blocks a portion of the radiant energy from reaching the adhesive layer. Apertures in the mask allow a portion of the radiant energy to transmit through the release liner to irradiate a portion of the adhesive layer. In one aspect, the mask is applied directly to the release liner. In another aspect, the mask is spaced from the release liner. In still another aspect, the mask is positioned between the release liner and the adhesive layer.

In several embodiments, the mask allows the radiant energy to irradiate and reduce the adhesion of the portion of the adhesive layer underlying the extended content printing. In one aspect, the mask is applied to the face layer but does not cover the extended content printing. The portion of the face layer including the modified adhesive and extended content can then be easily pulled from a substrate to which it is adhered in order to expose the back side of the face layer for viewing the extended content.

In another embodiment, the mask may cover, at least partially, the extended content printing. This may be advantageous where the covered portion of the extended content is intended to be seen through a clear substrate, such as through a clear bottle.

The mask may also be in the form of a cylinder including an internal source of radiant energy and defining one or more apertures along the outer circumferential surface that allow or permit the passage of radiant energy from the source to the exterior of the cylinder. This may be advantageous when processing extended content labels in a continuous or semi-continuous manner as described herein. The cylinder defines an outer circumferential surface that contacts the adhesive assembly. Upon contact with the adhesive assembly, radiant energy from the source can pass through select regions of the roller, to the adhesive assembly and thereby reach certain regions of adhesive within the adhesive assembly. It will be understood that the present subject matter includes a wide array of patterns, shapes, arrangements, and/or configurations for the apertures. Thus, in no manner are the apertures limited to a particular pattern. In certain aspects of the present subject matter, and when utilizing the cylinder or similar components, it may be desirable to provide drive controls or other control provisions such that the outer surface of the cylinder rotates in register control with the extended content repeated on the adhesive assembly. Insetting controls as known in the art can also be utilized. Although the embodiments described herein typically do not require focusing or magnification of the irradiated radiant energy, focusing and/or magnification provisions are included in the present subject matter. The diameter of the roll can be selected to match a particular print or die size or an integer number of label repeats.

Floodcoat

In various embodiments, a floodcoat is applied over the extended content indicia. The floodcoat is included to obscure the extended content indicia from being seen from a front side of the label. By hiding the extended content indicia in this way, front side indicia can be applied over the floodcoat and can be seen from the front side of the label without the extended content also being seen from the front side of the label.

The floodcoat may be at least partially opaque, or substantially so, and can be of any color, including white or black for example. In one embodiment, the floodcoat is substantially opaque to hide the extended content, and provides a substantially white background upon which the front side indicia can be applied.

Figure 4:
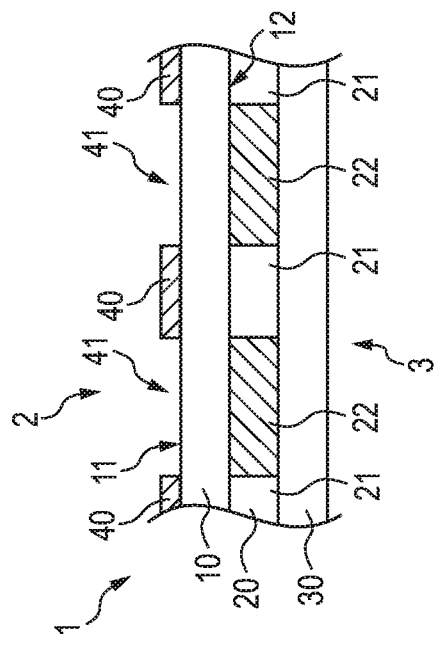
FIG. 4 is a schematic cross sectional view of the prefabricated adhesive assembly of FIG. 3 including a floodcoat applied thereto in accordance with the present subject matter.

The material used to form the floodcoat is not particularly limited by the present subject matter, and can comprise the same material use to form the mask, including liquid material such as inks and paints, or solid material such as paper, polymeric films, and metal foils for example. In one embodiment, the floodcoat is formed using flexographic UV-curable ink, flexographic water-based ink, flexographic solvent-based ink, or combinations thereof. The coat weight of the floodcoat depends on the level of transparency/opacity of the material used to form the floodcoat and how well it obscures the extended content from being seen from the front side of the label. When inks are used to form the floodcoat, the coat weight may depend on the pigment load and density of the inks. In one embodiment, the mask and floodcoat are formed from the same material In one embodiment and with reference to FIG. 4, the floodcoat 50 is applied to cover the face layer 10 and the mask 40. In another embodiment, the floodcoat is applied to cover the face layer and not to cover the mask. The floodcoat may be applied directly to the face layer and/or mask as shown in FIG. 4 for example, or may be spaced therefore, such as where an intervening layer is positioned between the floodcoat and the face layer.

In several embodiments, the floodcoat completely conceals the extended content indicia when viewed from the front side of the adhesive assembly. For example, the floodcoat may be substantially opaque and completely cover the extended content indicia.

In other embodiments, the floodcoat may only partially conceal the extended content indicia when viewed from the front side of the adhesive assembly. For example, the floodcoat may completely cover the extended content indicia but not be completely opaque, and therefore the extended content indicia may partially show through the floodcoat when viewed from the front side of the assembly. Alternatively, the floodcoat may not cover all of the extended content indicia, and therefore the non-covered extended content indicia may be seen from the front side of the assembly.

Front Side Printing

In various embodiments, indicia is applied over the floodcoat and is visible from the front side of the assembly or label, thereby defining the front side indicia. The front side indicia can comprise letters, numbers, shapes, designs, images, and other visual representation, or combinations or portions thereof. The front side indicia can comprise any number of colors or combination of colors. The front side indicia can have eggshell, sheen, sheer, satin, iridescent, shimmer, reflective, and holographic effects, or combinations thereof. The front side indicia can be substantially flat, or can be raised or three dimensional.

In embodiments where the extended contend indicia can be at least partially seen from the front side of the label, the front side indicia can be registered with the extended content indicia in order to provide a cohesive and layered design, configuration, or message.

The material used to form the front side indicia is not particularly limited by the present subject matter, and may comprise pigments, dyes, inks, paints, or other colorants, which can be applied by flexographic, rotogravure, screen printing, spraying, brushing, offset, or digital printing techniques, as non-limiting examples.

Other Optional Layers

The assemblies and labels of the present subject matter can include other layers or treatments for specific intended uses, and can include printing receptive layers or treatments, hydrophobic layers or treatments, additional film layers, or the like. Examples include priming, printing, hydrophobic treatments, etc. Other additional layers (such as a base layer for the extended content label), coatings, or treatments can be included in the labels as desired, interspersed between or around the layers, printing, indicia, and coatings described herein.

For example, visual indication provisions can be included or otherwise incorporated in the layered assemblies to denote regions or areas of deactivation (i.e. reduced adhesion) of the adhesive layer. For example, a color indicator can be used to denote regions or areas of the adhesive layer that has been deactivated or which are to be deactivated. One or more color indicators can be in the form of pigments, dyes, inks, or the like which provide a visual indication. The color indicators can be incorporated into particular layers, regions, or components of the adhesive assemblies or labels. Alternatively, or in addition, the one or more color indicators can be applied or otherwise deposited on select areas or regions of the adhesive assemblies or labels. It will be appreciated that the present subject matter is not limited to color indicators as described. Instead, the present subject matter includes any suitable means for denoting regions or areas of deactivation.

Methods

The present subject matter includes various methods of preparing extended content labels from previously prepared adhesive assemblies, and related methods of using the extended content labels. The methods include the use of previously prepared adhesive articles that include a substantially transparent face layer and a radiant energy sensitive adhesive layer. The methods include selectively reducing the adhesion of one or more regions of adhesive, and particularly region(s) of an adhesive layer in the adhesive assemblies. In certain embodiments, the methods of the present subject matter utilize a mask to selectively allow radiant energy to irradiate one or more regions of the adhesive layer, or at least facilitate the formation of regions of reduced adhesion. A floodcoat is applied over extended content indicia and front side indicia is applied over the floodcoat.

As discussed herein, conventional methods for preparing extended content labels require delamination of an opaque face layer from a release liner. Such delamination exposes a back side of the face layer for applying extended content indicia thereto. The conventional methods undesirably require delamination and relamination. In contrast, the methods of the instant subject matter do not require delamination to provide extended content to the adhesive assembly, and therefore do not require extra equipment for delamination and relamination.

FIGS. 1-5, 10-12 and 14 schematically illustrate methods and systems for preparing, and methods of using extended content labels prepared from prefabricated adhesive assemblies.

One method of preparing an extended content label is shown schematically in FIGS. 1-5, and includes providing a prefabricated adhesive assembly 1. As shown an adhesive assembly 1 includes a face layer 10, a release liner 30, and an adhesive layer 20 laminating the face layer to the release liner. The adhesive assembly 1 defines a front side 2 and an oppositely directed back side 3. The face layer 10 is directed toward the front side 2 of the adhesive assembly 1, while the release liner 30 is directed toward the back side 3 of the adhesive assembly 1.

The face layer 10 defines a front side 11 and an oppositely directed back side 12. The front side 11 is directed toward the front side 2 of the adhesive assembly 1, while the back side 12 is directed toward the back side 3 of the adhesive assembly 1. The front side 11 of the face layer 10 may define the front side 2 of the adhesive assembly 1. The laminated adhesive assembly 1 may be prepared before printing operations at a time and/or location remote from printing on the adhesive assembly, or may be prepared at the printing location and in line with the printing process.

The method also includes positioning a mask to cover the adhesive article. In one embodiment as shown in FIGS. 2-5, the mask is applied to the front side 11 of the face layer 10, thereby defining masked regions and apertures 41 in the mask 40. As will be understood, portions of the front side 11 of the face layer 10 not covered by the mask 40 will define apertures 41 that allow passage of radiant energy through the face layer 10 to the underlying adhesive layer 20.

The adhesive assembly 1 is irradiated with radiant energy such that the radiant energy passes through apertures 41 in the mask 40 to irradiate portions 22 of the adhesive layer 20. The radiant energy source is positioned at the front side 2 of the adhesive assembly 1 in order to allow the mask 40 to block a portion of the radiant energy from reaching the adhesive layer 20. The radiant energy not blocked by the mask passes through the transparent face layer 10, and thereby irradiates portions 22 of the adhesive layer 20. As described herein, the irradiated portions 22 of the adhesive layer 20 undergo a reduction in adhesion compared to the adhesion of the adhesive layer 20 before irradiation. Additionally, the non-irradiated portions 21 of the adhesive layer 20 substantially maintain their adhesion compared to the tack of the adhesive layer 20 before irradiation. The irradiated portion 22 of the adhesive layer 20 may have a reduced, or completely deadened adhesion. The mask 40 is configured to substantially block the radiant energy from reducing the adhesion of the non-irradiated portions 22 of the adhesive layer.

Although the mask 40 is shown in FIGS. 2-5 to be applied directly to the face layer 10, it will be understood that in other embodiments the mask may be applied to other areas of the adhesive assembly 1, or it may be spaced from the adhesive assembly 1. In embodiments where the mask is applied other than to the front side of the face layer, the mask will nevertheless block radiant energy from reaching portions of the adhesive layer intended to retain their original adhesion. In certain embodiments, the release liner is transparent and the mask is applied to the back side of the adhesive assembly, for example to the release liner. The radiant energy is directed from the back side of the adhesive assembly, through apertures in the mask to irradiate the adhesive layer to develop irradiated and non-irradiated portions of the adhesive layer. This is shown for example in FIG. 14, where the mask 40 is applied to the release liner 30 to thereby define masked regions and apertures 41 in the mask 40. As will be understood, portions of the release liner 30 not covered by the mask 40 will define apertures 41 that allow passage of radiant energy through the release liner 30 to the adhesive layer 20.

In an alternative embodiment, the mask 40 may be spaced from the adhesive assembly 1, wherein the mask is not applied directly to the adhesive assembly, but is held a certain distance from the adhesive assembly. In this embodiment, the mask can be positioned on the front side 2 or the back side 3 of the adhesive assembly, as long as the corresponding adjacent face layer 10 or release liner 30 is at least partially transparent to the radiant energy. This configuration is shown for example in FIG. 12, which is discussed in more detail herein. The mask may be configured in any desirable fashion. For example, the mask may constitute a frame, lines, various shapes, or patterns of any desired sort.

In several embodiments, the methods include applying a floodcoat to cover the extended content indicia so that the extended content indicia is not visible from the front side 2 of the assembly. This is shown for example in FIG. 4, wherein floodcoat 50 is applied to the front side 11 of face layer 10. As shown, the floodcoat 50 covers the front side 11 of face layer 10 and the mask 40. In one embodiment, the floodcoat does not cover the mask.

In several embodiments, the floodcoat is substantially opaque, thereby substantially preventing the extended content indicia from being visible from the front side 2 of the adhesive assembly 1. As such, the extended content indicia will only be visible from the back side 12 of the face layer 10, such as upon peeling the face layer 10 from the release liner 30 or from a substrate to which it is adhered. The floodcoat may include the same composition as the mask 40, and therefore may be applied only over the apertures 41 in the mask 40. In this embodiment, the floodcoat and mask together provide an opaque layer upon which front side printing can be applied.

In several embodiments, the methods include applying front side indicia over the floodcoat, such that the front side indicia can be seen or is visible from the front side 2 of the adhesive assembly 1. As will be understood, the front side indicia would be visible when the extended content label is applied to a substrate, while the back side indicia or extended content indicia would not be visible from the front side 2 of the adhesive assembly.

The adhesive assembly including the mask 40, the adhesive layer 20 having areas 22 of reduced adhesion, the extended content indicia, the floodcoat 50, and the front side indicia, together define an extended content label 4 in accordance with the present subject matter. As will be understood, other or different layers may be included in the extended content label 4 as desired.

In several embodiments the extended content labels are produced in a continuous or semi-continuous manner, and the methods may therefore include die cutting a roll of the label material to form individual extended content labels. Die cutting individual labels is shown schematically for example in FIG. 4, wherein the assembly is die cut along dotted lines 60 to thereby produce individual labels 4, one of which is shown for example in FIG. 5. As will be understood, die cutting may be used to apply cuts, scores, or perforations on the assembly, and thus may not penetrate every layer of the assembly, but may cut through less than all the layers of the assembly. For example, die cutting may cut through all layers of the assembly 1, except for the release liner 30.

Figure 6:
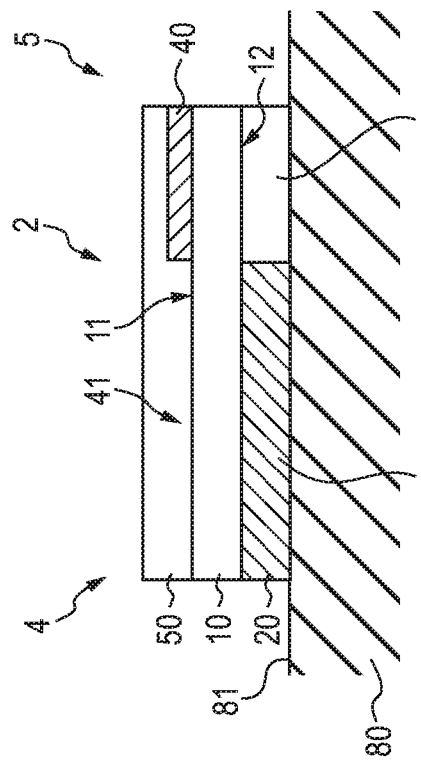
FIG. 6 is a schematic cross sectional view of the individual extended content label of FIG. 5 adhered to a substrate in accordance with the present subject matter.
Figure 5:
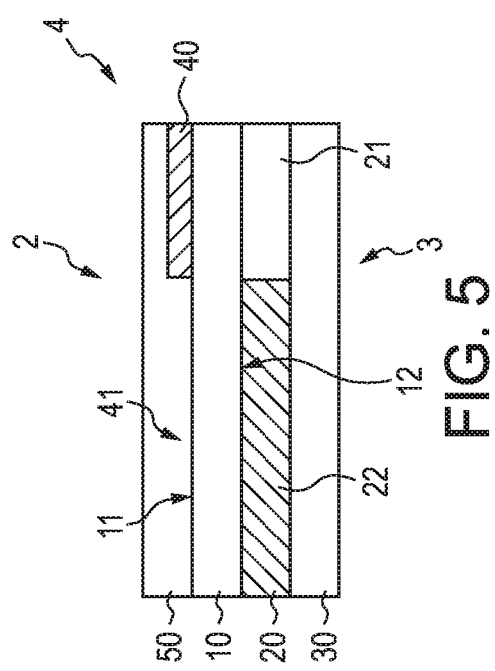
FIG. 5 is a schematic cross sectional view of an embodiment of an individual extended content label in accordance with the present subject matter.

The present subject matter also includes methods for using an extended content label. In one exemplary embodiment, shown for example in FIGS. 5-7, an extended content label 4 includes a release liner 30 covering an adhesive layer 30. The release liner 30 is removed from the label 4 in order to expose the adhesive layer 20. The extended content label 4 is then adhered to the surface 81 of a substrate 80 by contacting the adhesive layer 20 to surface 81, as shown in FIG. 6. An adhesive bond is formed between the adhesive layer 20 and the surface 81 of the substrate 80.

Figure 7:
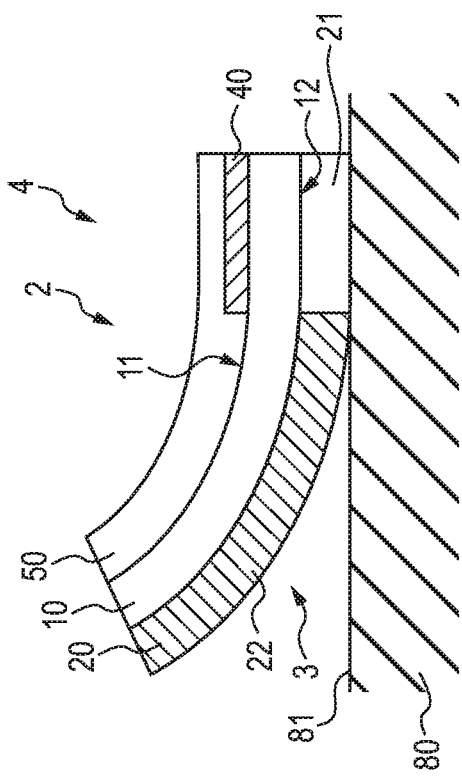
FIG. 7 is a schematic cross sectional view of the individual extended content label of FIG. 6 partially pulled from the substrate is accordance with the present subject matter.

The non-irradiated portion 21 of the adhesive layer 2, which retains its original adhesion from prior to exposure to radiant energy, may form a permanent bond with the substrate 80 and act as a type of hinge for the face layer 10. The irradiated portion 22 of the adhesive layer 20, which has reduced adhesion as a result of exposure to radiant energy, forms a removable bond with the substrate 80. In this respect, the portions of the face layer 10 including the irradiated portion 22 of the adhesive layer have reduced adhesion with the substrate and can be pulled or peeled from the substrate 80 as shown in FIG. 7, in order to expose the back side 3 of the extended content label 4. When this is done, the extended content indicia applied on the front side 11 of the face layer 10, can be seen from the back side 3 of the extended content label 4, through the transparent face layer 10 and through the transparent adhesive layer 20. In this embodiment, the transparent face layer and adhesive layer allow the extended content indicia to be viewed from the back side 3 of the extended content label 4.

Figure 8:
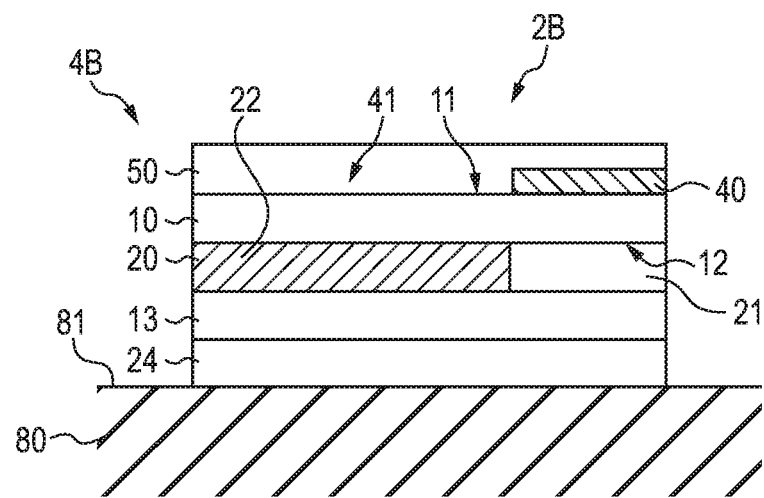
FIG. 8 is a schematic cross sectional view of another embodiment of an individual extended content label adhered to a substrate in accordance with the present subject matter.
Figure 9:
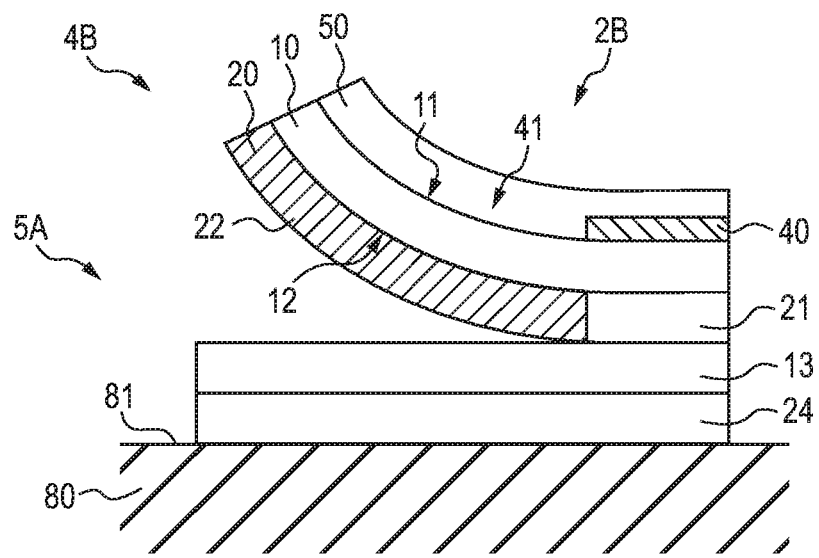
FIG. 9 is a schematic cross sectional view of the individual extended content label of FIG. 8 partially pulled from its base layer to reveal extended content in accordance with the present subject matter.

As will be understood, the substrate 80 may comprise a base layer of the extended content label, a product or package for a product, or other substrate as desired such as a bottle or other container for example. FIGS. 8 and 9 depict another embodiment, wherein the extended content label 4B further includes a base layer 13 and a base adhesive layer 24 which adheres the extended content label 4B to a surface 81 of a substrate 80. The substrate to which the base adhesive layer is adhered could comprise a package or a product, or other type of substrate as desired such as a bottle or other container. The base adhesive 24 may or may not be sensitive to radiant energy, and may form a permanent bond with the substrate 80. Before application to a substrate, a release liner, which covers the base adhesive 24, may be removed to expose the base adhesive 24. In this embodiment, the other components of the extended content label 4B can be similar to that as previously described in regard to FIGS. 1-5. In particular, the extended content label 4B can include the face layer 10 having an adhesive layer 20 including an irradiated portion 22 underlying apertures 41 in the mask and having a reduced adhesion, and a non-irradiated portion 21 underlying the mask 40 and retaining an original adhesion. A floodcoat 50 can be applied to cover the extended content indicia on the front side 11 of the face layer 10. Front side indicia can be applied over the floodcoat 50 to be visible from the front side 2B of the extended content label 4B.

The non-irradiated portion 21 of the adhesive layer 20 can form a permanent bond between the face layer 10 and the base layer 13. The irradiated portion 22 of the adhesive layer 20 can form a removable bond between the face layer 10 and the base layer 13, such that a portion of the face layer 10 that includes the irradiated portion 22 can be pulled from the base layer 13 as shown in FIG. 9, in order to expose a back side 12 of the face layer 10. When this is done, the extended content indicia originally applied to the front side 11 of the face layer 10 is visible through the face layer 10 and adhesive layer 20. In this embodiment it will also be understood that further indicia or printing can be applied over the base layer 13 on a side of the base layer 13 facing the adhesive layer 20. This further indicia applied to the base layer 13 would also be visible upon pulling the face layer 10 from the base layer 13, thereby providing additional extended content to the label 4B.

Figure 13:
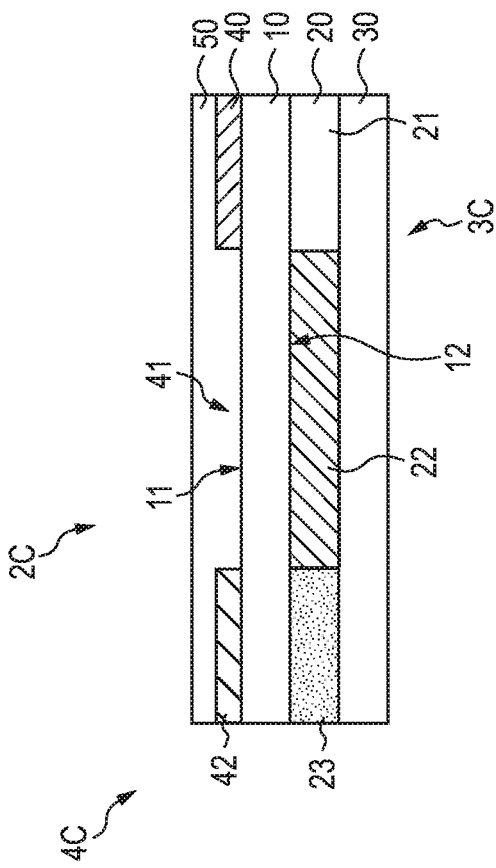
FIG. 13 is a schematic cross sectional view of another individual extended content label in accordance with the present subject matter.

In another embodiment, shown for example in FIG. 13, an extended content label 4C defines a first side 2C and a second side 3C, and includes an adhesive layer 20 including an area 23 of reduced adhesion, an area 22 of deadened adhesive, and an area 21 maintaining its original adhesion. This may be provided by preparing an extended content label using two different masks 40, 42. For example, a first mask 40 may be used to substantially block radiant energy from irradiating underlying portions of the adhesive layer 20, while a second mask 42 partially blocks (i.e. partially transmits) radiant energy. The first mask 40 and the second mask 42 thereby define an aperture 41 through which radiant energy can be fully transmitted.

As radiant energy is directed toward the extended content label 4C, the radiant energy will be substantially blocked by first mask 40, partially blocked by second mask 42, and transmitted through aperture 41. As such, a non-irradiated portion 21 of the adhesive layer underlying the first mask 40 will maintain its original adhesion, a first irradiated portion 22 underlying the aperture 41 will be completely deadened and have no adhesion, and a second irradiated portion 23 underlying the second mask 42 will have a reduced adhesion because the second mask 42 allows a portion of the radiant energy to pass therethrough. The label 4C may then be adhered to a substrate by removing the release liner 30 to expose the adhesive layer 20 and contacting the adhesive layer to a substrate. The non-irradiated portion 21 of the adhesive layer 20 may form a permanent adhesive bond with the substrate, the first irradiated portion 22 may form no adhesive bond with the substrate, and the second irradiated portion 23 may form a removable bond with the substrate. The portion of the face layer including first irradiated portion 22 will not adhere to the substrate, but an edge portion of the extended content label 4C that includes the second irradiated portion 23 will have reduced adhesion in order to form a removable bond with the substrate and to allow the portions of the face layer including the first 22 and second 23 irradiated portions to be peeled from the substrate to reveal the extended content. This configuration may be advantageous in situations where the extended content label is designed to reclose against the substrate.

The present subject matter also includes continuous, or semi-continuous methods and systems of preparing extended content labels. Several exemplary methods are shown for example in FIGS. 10-12. Several features that are similar between FIGS. 10-12 have reference numerals that are increased by adding 200 to each successive figure.

Figure 10:
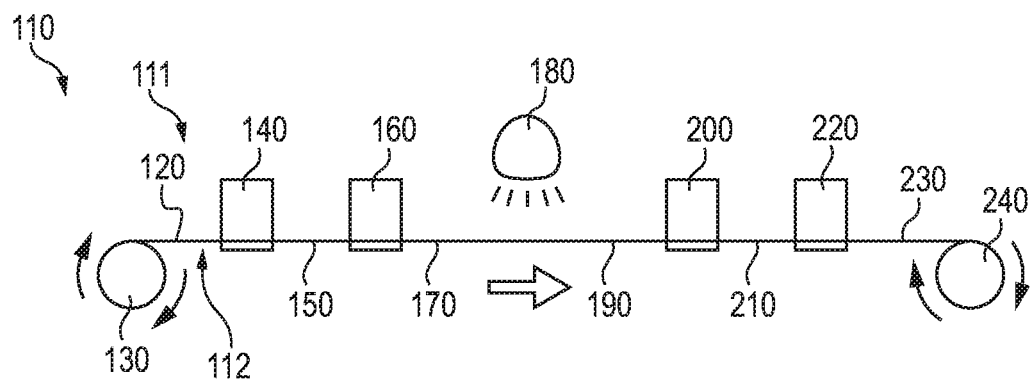
FIG. 10 is a process schematic illustrating a system and method in accordance with the present subject matter.

As shown in FIG. 10, a system 110 for producing extended content labels in a continuous or semi-continuous fashion is shown. The system 110 includes an unwind roller 130 having thereon a roll or an adhesive assembly web 120. The adhesive assembly web 120 can comprise an adhesive assembly as previously described with respect to FIG. 1, and in the form of a continuous or semi-continuous roll or web, including a face layer, a release liner, and an adhesive layer laminating the face layer to the release liner.

As shown in FIG. 10, the adhesive assembly web 120 is unwound from the unwind roller 130, such that a front side 111 of the adhesive assembly web 120 is positioned facing up, and a back side 112 of the adhesive assembly web 120 is facing down. It will be understood that in accordance with the present subject matter, the orientation of the front 111 and back side 112 of the adhesive assembly web 120 can be positioned differently as desired, such as by having the front side 111 facing down and the back side 112 facing up.

The adhesive assembly web 120 is then delivered to an extended content printing station 140, wherein extended content is applied to the front side 111 of the adhesive assembly web 120 as reverse printing. After leaving the front side printing station 140, the extended content printed adhesive assembly 150 enters the masking station 160, wherein a mask is applied to the front side 111 of the assembly 150. Thereafter, the masked adhesive assembly 170 is fed to the radiant energy device 180, which irradiates the assembly 170 to thereby produce an irradiated portion of the adhesive layer and a non-irradiated portion of the adhesive layer. The irradiated adhesive assembly 190 is then fed through the floodcoat applicator 200, wherein a floodcoat is applied over the front side 111 of the assembly 190. The floodcoated assembly 210 is then fed to the front side printing station 220, wherein front side printing is applied over the floodcoat such that it is visible from the front side 111 of the assembly 210, thereby defining a continuous or semi-continuous roll of an extended content label web 230, which then exits the front side printing station 220 to be wound on a rewind roller 240 as shown.

Figure 11:
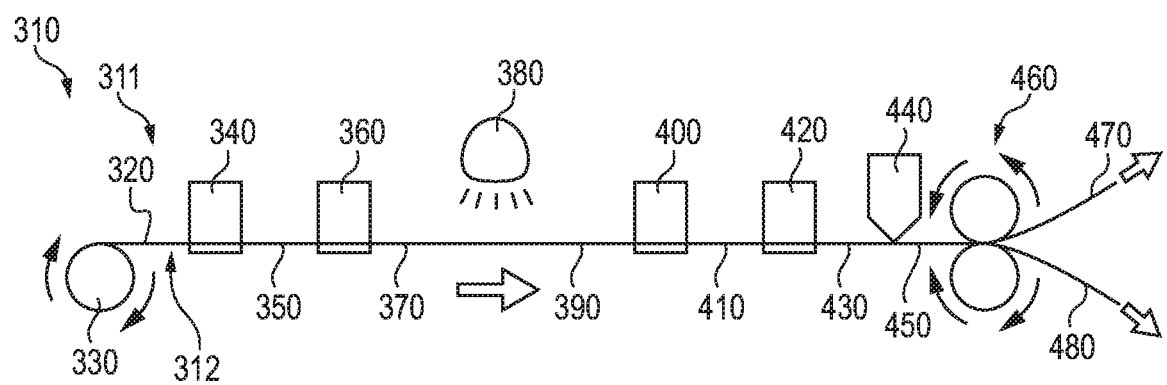
FIG. 11 is another process schematic illustrating a system and method in accordance with the present subject matter.

FIG. 11 depicts another system and method, wherein features shown in FIG. 11 have reference numerals increased by 200 compared to similar features described in regard to FIG. 10. However, the system 310 shown in FIG. 11 includes several additional features not described in regard to FIG. 10. More specifically, the system 310 of FIG. 11 includes a die cutting station 440, wherein the extended content label web 430 exiting the front side printing station 220 enters a die cutting station 440. At the die cutting station 440, individual extended content labels are die cut into the web 430. The die cut web 450 thereafter enters a matrix stripping station 460 wherein waste matrix 470 is removed from the die cut web 450 to produce individual extended content labels on the web 480.

FIG. 12 shows another system and method, wherein features shown in FIG. 12 have reference numerals increased by 200 compared to similar features described in regard to FIG. 11, and increase by 400 compared to similar features described in regard to FIG. 10. The system 510 shown in FIG. 12 does not include a masking station as previously shown in FIGS. 10 and 11, but instead includes a stationary mask 560 that is positioned in relation to the radiant energy device 580. As shown, the mask 560 defines an aperture 561 through which radiant energy is transmitted to the extended content printed adhesive assembly 550. After being irradiated by radiant energy, a floodcoat and front side printing is applied as described herein, and the extended content label web 630 is rewound on the rewind roller 640. In this embodiment, the stationary mask 560 is positioned relative to the radiant energy device 580, and thereby obviates the need for the application of a mask to the adhesive assembly at a masking station.

As will be understood, for the systems depicted in FIGS. 10-12, the front side and back side of the adhesive assembly web can be reversed in relation to the radiant energy source and other components of the systems. In these alternative embodiments, it will be understood that the release liner may be transparent to radiant energy and that the mask may be applied to the release liner or be positioned between the release liner and the radiant energy source. As such the radiant energy will pass through apertures in the mask and irradiate the adhesive layer after it passes through the transparent release liner.

In an additional aspect, the present subject matter includes a particular method for using a mask not directly applied to a laminate. Generally, the strategy is to position the radiation source inside a substantially transparent roller, which has an opaque mask pattern on the roller. The laminate is passed over the roller and selectively exposed through the mask. Because the mask rolls with the moving laminate, this has the advantage of allowing patterns that could not be made using the fixed-in-place mask depicted in FIG. 12.

Figure 16:
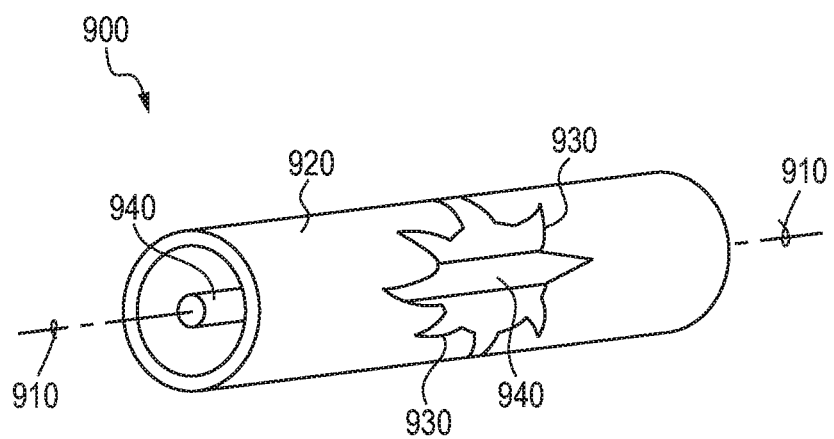
FIG. 16 is a schematic perspective view of a roller component in accordance with the present subject matter.

The present subject matter also provides particular components and/or equipment for performing selective detackification of adhesive regions within a layered assembly. FIG. 16 schematically depicts a detackifying roller 900 in accordance with the present subject matter. The roller 900 is in the form of a cylinder and defines an outer circumferential surface 920 that contacts the layered assembly or other material to be selectively irradiated with radiant energy. The roller 900 is configured to rotate about an axis of rotation 910. The roller 900 also comprises a source 940 of radiant energy such as an emitter of UV light. The roller 900 also defines one or more passage areas or regions 930 along the outer circumferential surface 920 that allow or permit the passage of radiant energy from the source 940 to the exterior of the roll 900. Thus, upon contact or appropriate placement of a layered assembly to be detackified along the roll, radiant energy such as UV light from the source 940 can pass through select regions of the roller, i.e., the passage regions 930, to the layered assembly and thereby reach certain regions of adhesive within the layered assembly. It will be understood that the present subject matter includes a wide array of patterns, shapes, arrangements, and/or configurations for the passage regions 930. Thus, in no manner is the present subject matter limited to the particular pattern of the passage region 930 depicted in FIG. 16.

In certain aspects of the present subject matter, and when utilizing the roller 900 or similar components, it may be desirable to provide drive controls or other control provisions such that the outer surface of the roller rotates in register control with a pattern repeated on the layered assembly, e.g., label. Insetting controls as known in the art can also be utilized. Although the embodiments described herein typically do not require focusing or magnification of the irradiated radiant energy, focusing and/or magnification provisions are included in the present subject matter.

The detackifying rollers such as roller 900 can include particular features such as the use of a honeycomb grated surface. The outer roll surface may be covered with flex plate or foil. For example, it is contemplated that a template containing artwork or other design(s) could be printed or otherwise be formed and positioned about a roll to thereby constitute the outer roll circumferential surface. The diameter of the roll can be selected to match a particular print or die size or an integer number of label repeats.

It will be also understood that the present subject matter includes a wide array of configurations of labels with various arrangements and locations of regions of (i) reduced adhesion, (ii) completely deadened adhesive, and (iii) non-reduced adhesion or non-deadened adhesive. That is, in no way is the present subject matter limited to any of the representative embodiments described or shown herein.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method of producing an extended content adhesive assembly having at least one region of reduced adhesion, the method comprising:
    providing a laminated adhesive assembly comprising a face layer defining a front side and an oppositely directed back side, a release liner, and an adhesive layer disposed between the back side of the face layer and the release liner;
    applying indicia to the front side of the face layer;
    applying a mask to cover a portion of the adhesive layer; and
    irradiating the adhesive assembly with radiant energy,
    wherein the mask substantially blocks a portion of the adhesive layer from exposure to the radiant energy,
    wherein the radiant energy not blocked by the mask irradiates a region of the adhesive layer to thereby reduce an adhesion of the irradiated region of the adhesive layer,
    wherein the indicia is visible from the back side of the face layer and through the adhesive layer, thereby defining extended content.

2. The method according to claim 1, wherein applying the mask is performed after the indicia is applied.

3. The method according to claim 1, further comprising applying a floodcoat to cover the indicia, wherein the indicia is not visible through the floodcoat.

4. The method according to claim 1, wherein the adhesive layer comprises an amount of functionalized emulsion polymer.

5. The method according to claim 4, wherein the functionalized emulsion polymer is prepared by treating an emulsion polymer having carboxylic acid functional monomers with at least one ethylenically unsaturated monomer including an epoxy group in the presence of a catalyst.

6. The method according to claim 5, further comprising applying additional indicia over the floodcoat, wherein the additional indicia is visible from the front side of the face layer and is not visible from the back side of the face layer.

7. The method according to claim 5, wherein the carboxylic acid functionalized monomers are selected from the group consisting of acrylic acid, methacrylic acid, itaconic acid, citraconic acid, acryloxypropionic acid, maleic acid, methacryloxyisopropyl acid phthalate, methacryloxyethyl acid phthalate, acryloxyisopropyl acid phthalate, acryloxyethyl acid phthalate, and combinations thereof.

8. The method according to claim 5, wherein the ethylenically unsaturated monomer including an epoxy group is selected from the group consisting of glycidyl methacrylate, glycidyl acrylate, acrylated epoxidized soybean oil, allyl glycidyl ether, 3,4-epoxycyclohexyl methyl methacrylate, and combinations thereof.

9. The method according to claim 5, wherein the catalyst is selected from the group consisting of tetrabutyl ammonium hydroxide, methyl tributyl ammonium hydroxide, ammonium hydroxide, tetrabutyl ammonium chloride, methyltributyl ammonium chloride, triphenyl phosphine, chromium acetate, and combinations thereof.

10. The method according to claim 4, wherein the adhesive layer further comprises an ultraviolet photoinitiator.

11. The method according to claim 1, wherein a portion of the adhesive layer not exposed to radiant energy substantially maintains same adhesion as compared to prior to irradiating the adhesive assembly with radiant energy.

12. A method of providing extended content on a label, the method comprising:
    providing a laminated adhesive label defining a front side and a back side, and including,
    a transparent face layer defining a front side and an oppositely disposed back side, the front side of the face layer being directed toward the front side of the label,
    a layer of radiant energy sensitive adhesive disposed at the back side of the face layer, the adhesive being configured to undergo a reduction in adhesion upon exposure to an amount of radiant energy, and
    a release liner laminated to the back side of the face layer by the adhesive;
    applying indicia to the front side of the face layer;
    covering a portion of the layer of adhesive with a mask; and
    irradiating the adhesive label with radiant energy,
    wherein the mask provides a non-irradiated region of the layer of adhesive by substantially blocking radiant energy from reaching the non-irradiated region,
    wherein radiant energy not substantially blocked by the mask provides an irradiated region of the layer of adhesive by exposing the irradiated region of the layer of adhesive to an amount of radiant energy to thereby reduce an adhesion of the irradiated region,
    wherein the indicia is applied over the irradiated region of the layer of adhesive and the indicia is visible from the back side of the face layer, thereby providing extended content on the label.

13. The method according to claim 12, wherein the mask is applied to the front side of the face layer and the radiant energy is directed through the face layer to the adhesive layer.

14. The method according to claim 12, wherein an adhesion of the non-irradiated region is substantially same as the adhesive of that region prior to irradiating.

15. The method according to claim 12, wherein upon removal of the release liner, the irradiated region is configured to form a removable adhesive bond with an associated substrate.

16. The method according to claim 12, wherein upon removal of the release liner or upon peeling the irradiated region from an associated substrate, the indicia is visible from the back side of the label.

17. The method according to claim 12, wherein covering the layer of adhesive with the mask is performed after the indicia is applied.

18. The method according to claim 12, further comprising applying a floodcoat to cover the indicia, wherein the indicia is not visible through the floodcoat from the front side of the label.

19. The method according to claim 18, further comprising applying additional indicia over the floodcoat, wherein the additional indicia is visible from the front side of the label and is not visible from the back side of the label.

20. A method of providing extended content on a substrate, the method comprising:
providing a substrate;
providing a laminated adhesive label defining a front side and a back side, the label comprising,
a transparent face layer,
a release layer, and
a layer of adhesive laminating the face layer to the release layer, wherein upon exposure to radiant energy, the adhesive undergoes a reduction in adhesion;
applying indicia to the face layer, the indicia being visible through the face layer and thereby defining the extended content;
applying a mask to cover a portion of the layer of adhesive;
exposing the label to radiant energy such that radiant energy not blocked by the mask irradiates the adhesive to reduce adhesion of an irradiated region of the layer of adhesive;
removing the release layer from the label to thereby expose the layer of adhesive;
adhering the label to the substrate by contacting the layer of adhesive to a surface of the substrate,
wherein the reduced adhesion of the irradiated region of the layer of adhesive is configured to allow a portion of the face layer including the irradiated region to be removed from the substrate to expose the extended content.

21. The method according to claim 20, wherein an adhesion of a non-irradiated region of the layer of adhesive is substantially same as the adhesion of that region prior to irradiating.

22. The method according to claim 20, further comprising applying a floodcoat over the indicia, wherein the indicia is not visible through the floodcoat from the front side of the label.

23. The method according to claim 20, further comprising applying additional indicia over the floodcoat, wherein the additional indicia is visible from the front side of the label and is not visible from the back side of the label.

24. A system for selectively reducing adhesion of an adhesive within a prefabricated adhesive assembly to produce an extended content label, the system comprising:
a prefabricated adhesive assembly including (i) a face layer which is at least substantially transparent and including a front side and a back side, (ii) a release liner, and (iii) an adhesive layer disposed between the face layer and the release liner, the adhesive layer having a characteristic such that upon exposure to radiant energy, the exposed adhesive undergoes a reduction in adhesion, (iv) indicia on a front side of the face layer which is visible through the face layer from the back side of the face layer, and (v) a mask positioned to cover at least a portion of the adhesive layer and defining at least one passage region which permits the radiant energy to pass therethrough to the adhesive layer; and
a source of radiant energy configured to irradiate the adhesive layer through the at least one passage region in the mask to reduce adhesion of at least a portion of the adhesive layer and thereby produce an extended content label.

25. The system of claim 24, further comprising a floodcoat to cover the indicia such that the indicia is not visible through the floodcoat from the front side of the label.

26. The system of claim 25, further comprising additional indicia disposed on the floodcoat, wherein the additional indicia is visible from the front side of the label and is not visible from the back side of the label.

* * * * *